US010899311B2

(12) United States Patent
Ohno et al.

(10) Patent No.: US 10,899,311 B2
(45) Date of Patent: Jan. 26, 2021

(54) PASSENGER RESTRAINING DEVICE FOR VEHICLE

(71) Applicant: TOYOTA JIDOSHA KABUSHIKI KAISHA, Toyota (JP)

(72) Inventors: Mitsuyoshi Ohno, Miyoshi (JP); Hiroe Sugawara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/219,486

(22) Filed: Dec. 13, 2018

(65) Prior Publication Data

US 2019/0193672 A1  Jun. 27, 2019

(30) Foreign Application Priority Data

Dec. 27, 2017  (JP) ................................ 2017-251756
Oct. 30, 2018  (JP) ................................ 2018-204287

(51) Int. Cl.
*B60R 22/12* (2006.01)
*B60R 22/26* (2006.01)
(Continued)

(52) U.S. Cl.
CPC .............. *B60R 22/12* (2013.01); *B60R 22/00* (2013.01); *B60R 22/023* (2013.01); *B60R 22/26* (2013.01);
(Continued)

(58) Field of Classification Search
CPC ...... B60R 2022/1818; B60R 2022/006; B60R 22/26; B60R 22/12; B60R 22/00;
(Continued)

(56) References Cited

U.S. PATENT DOCUMENTS 4,681,345 A * 7/1987 Swartout ............... B60R 22/023
                                              280/801.1
5,161,824 A * 11/1992 Li ......................... B60R 22/14
                                              280/801.1
(Continued)

FOREIGN PATENT DOCUMENTS

JP    2000-142303 A    5/2000
JP    2004-075015 A    3/2004
(Continued)

OTHER PUBLICATIONS

Feb. 22, 2019 Extended European Search Report issued on in corresponding European Patent Application No. 18213859.4.

*Primary Examiner* — Milton Nelson, Jr.
(74) *Attorney, Agent, or Firm* — Oliff PLC

(57) ABSTRACT

A passenger restraining device for a vehicle having a three-point seatbelt device, a shoulder belt extending from above, a seat transverse direction one end side of a seatback of a vehicle seat toward a lower portion; a belt guide at an upper portion side of the seat transverse direction one end side of the seatback, through which the shoulder belt is inserted, that's disposed along a restrained surface of a passenger seated in the vehicle; a fixing portion fixes a rear end portion of the belt guide to a seat shoulder opening at the seat transverse direction one end side of an upper portion of the seatback; and a front side portion at a length direction front side of the belt guide, in a usual state, disposed further toward a vehicle front side than a collarbone of the passenger seated in the vehicle, and structured to be hard to bend.

13 Claims, 18 Drawing Sheets

(51) Int. Cl.
  *B60R 22/00*   (2006.01)
  *B60R 22/28*   (2006.01)
  *B60R 22/02*   (2006.01)
  *B60R 22/18*   (2006.01)

(52) U.S. Cl.
  CPC ........ *B60R 22/28* (2013.01); *B60R 2022/006* (2013.01); *B60R 2022/1818* (2013.01)

(58) Field of Classification Search
  CPC . B60R 22/28; B60R 2022/286; B60R 22/023; B60R 2022/1843
  USPC .......................... 297/473, 482, 483, 486, 488
  See application file for complete search history.

(56)       References Cited

U.S. PATENT DOCUMENTS

| | | | | |
|---|---|---|---|---|
| 5,294,183 | A | * | 3/1994 | Wetter .................... B60R 22/14 |
| | | | | 297/216.11 |
| 2012/0205960 | A1 | * | 8/2012 | Finch ...................... B60R 22/00 |
| | | | | 297/470 |
| 2019/0106079 | A1 | | 4/2019 | Ohno |

FOREIGN PATENT DOCUMENTS

| | | |
|---|---|---|
| JP | 2008-290697 A | 12/2008 |
| JP | 2015-123915 A | 7/2015 |

\* cited by examiner

PASSENGER RESTRAINING DEVICE FOR VEHICLE

CROSS-REFERENCE TO RELATED APPLICATION

This application is based upon and claims the benefit of priority of the prior Japanese Patent Application No. 2017-251756, filed on Dec. 27, 2017, and the prior Japanese Patent Application No. 2018-204287, filed on Oct. 30, 2018, the entire contents of which are incorporated herein by reference.

FIELD

The embodiments discussed herein are related to a passenger restraining device for a vehicle.

BACKGROUND

Patent Document 1 (Japanese Patent Application Laid-Open (JP-A) No. 2004-075015) discloses a structure in which a chest abutting member is provided at a shoulder belt, and a pad member, which changes the rigidity of the portion, which corresponds to the chest portion of the passenger, of this chest abutting member in accordance with the rigidity distribution of the chest portion of the passenger, is provided. In this structure, the deformation of the body of the passenger, with respect to the chest abutting member at the time when the chest portion is restrained due to a front collision, is distributed substantially uniformly, and the burden to the body of the passenger is decreased. Note that Patent Document 2 (JP-A No. 2015-123915) discloses an air belt device that mitigates the impact arising at a passenger by, at the time of an emergency, inflating a bag (e.g., an air belt) that is installed within the shoulder belt, and enlarging the range of restraining the chest portion of the passenger, and causing the pressure that arises at the passenger to be received at the shoulder portion that has relatively high strength among the parts of the skeleton of a human body. Further, Patent Document 3 (JP-A No. 2000-142303) discloses a structure in which an airbag, which is a body separate from the seatbelt and which is disposed so as to be relatively movable, is provided at a shoulder belt portion that is positioned at the vehicle cabin outer side of the head portion of the passenger.

In the structure of Patent Document 1 (JP-A No. 2004-075015), the chest abutting member is suspended downward at the shoulder anchor mounting portion by a flexible arm that is a predetermined length and serves as a positioning means, and the chest abutting member is positioned at the chest portion of the passenger. However, there is the possibility that, due to differences in the physiques of and differences in the seated postures of passengers, the chest abutting member will move to various positions, and the chest abutting member will not be able to be set at an appropriate position with respect to the chest portion of the passenger. Further, there is the possibility that, at the time of a front collision, the chest abutting member will not be able to follow the forward movement of the passenger and will stay at its initial position and come away from the chest portion of the passenger, and will not be able to receive load at an appropriate position.

SUMMARY

In view of the above-described circumstances, an object of the present disclosure is to obtain a passenger restraining device for a vehicle that can transmit inputted load from a shoulder belt side to the collarbone of a passenger at the time of a front collision.

A passenger restraining device for a vehicle relating to a first aspect has: a three-point seatbelt device including a shoulder belt that extends from above a seat transverse direction one end side of a seatback, which structures a vehicle seat in which a passenger sits, toward a buckle that is at a lower portion of a seat transverse direction another end side; a belt guide that is provided at an upper portion side of the seat transverse direction one end side of the seatback, through which the shoulder belt is inserted, and that is disposed along a restrained surface of the passenger seated in the vehicle seat; a fixing portion that fixes a length direction rear end portion of the belt guide to a seat shoulder opening that is at the seat transverse direction one end side of an upper portion of the seatback; and a front side portion that is provided at a length direction front side of the belt guide, that, in a usual state, is disposed further toward a vehicle front side than a collarbone of the passenger seated in the vehicle seat, and that is structured so as to be hard to bend as compared with a length direction rear side portion of the belt guide.

In accordance with the passenger restraining device for a vehicle relating to the first aspect, the shoulder belt of the three-point seatbelt device extends from above the seat transverse direction one end side of the seatback toward the buckle that is at the lower portion of the seat transverse direction another end side. The belt guide, through which the shoulder belt is inserted, is provided at the upper portion side of the seat transverse direction one end side of the seatback. The length direction rear end portion of the belt guide is, by the fixing portion, connected to and fixed to the seat shoulder opening that is at the seat transverse direction one end side of the upper portion of the seatback. Due thereto, when the passenger seated in the vehicle seat wears the seatbelt of the three-point seatbelt device, the shoulder belt moves relatively along the belt guide in accordance with the operations of putting-on/taking-off the seatbelt and the changes in the posture of the passenger. The belt guide is structured such that it is hard for the length direction front side portion thereof to bend as compared with the rear side portion thereof. In the usual state (i.e., in a state that is not at the time of a front collision), the front side portion of the belt guide is disposed further toward the vehicle front side than the collarbone of the passenger seated in the vehicle seat. Due thereto, in the usual state, the rear side portion that bends more easily than the front side portion of the belt guide is disposed at a position facing the collarbone of the passenger.

When the passenger moves toward the vehicle front side with respect to the seatback at the time of a front collision, the belt guide shifts upward and rearward with respect to the passenger. At this time, because it is more difficult for the length direction front side portion of the belt guide to bend than the rear side portion, the front side portion that is hard to bend cannot run along the shoulder belt more than that (i.e., cannot pass the curved portion of the shoulder portion of the passenger), and stays at the front side of the shoulder portion of the passenger. Therefore, regardless of the physique of or the seated posture of the passenger, the belt guide self-fits at an appropriate position of the passenger, and the collarbone of the passenger can be pushed by the front side portion of the belt guide. Accordingly, load to the passenger can be transmitted from the shoulder belt to the collarbone whose resistance is higher.

In a passenger restraining device for a vehicle relating to a second aspect, in the passenger restraining device for a vehicle of the first aspect, the fixing portion is structured so as to cancel fixing of the seat shoulder opening and the length direction rear end portion of the belt guide when tension of a predetermined value or greater is applied.

In accordance with the passenger restraining device for a vehicle relating to the second aspect, when tension of a predetermined value or greater is applied to the fixed portion due to a front collision, the fixing of the seat shoulder opening and the length direction rear end portion of the belt guide by the fixing portion is cancelled. Due thereto, the belt guide can be moved toward the vehicle front side with respect to the seat shoulder opening of the seatback, and the belt guide can be disposed at an appropriate position of the passenger even in the latter half of a collision.

In a passenger restraining device for a vehicle relating to a third aspect, in the passenger restraining device for a vehicle of the first aspect, the fixing portion is structured so as to, when tension of a predetermined value or greater is applied, extend in accordance with a distance between the seat shoulder opening and the length direction rear end portion of the belt guide.

In accordance with the passenger restraining device for a vehicle relating to the third aspect, when tension of a predetermined value or greater is applied to the fixing portion due to a front collision, the fixing portion extends in accordance with the distance between the seat shoulder opening and the length direction rear end portion of the belt guide. Due thereto, the belt guide can be moved toward the vehicle front side with respect to the seat shoulder opening of the seatback, and the belt guide can be disposed at an appropriate position of the passenger even in the latter half of a collision.

In a passenger restraining device for a vehicle relating to a fourth aspect, in the passenger restraining device for a vehicle of any one of the first through third aspects, the belt guide has a belt insert-through portion through which the shoulder belt is inserted, and a pad that is disposed, with respect to the belt insert-through portion, at a side of the passenger seated in the vehicle seat.

In accordance with the passenger restraining device for a vehicle relating to the fourth aspect, the pad is disposed at the belt guide at the side of the passenger who is seated in the vehicle seat, with respect to the belt insert-through portion through which the shoulder belt is inserted. Due thereto, the comfort at the time of wearing the seatbelt improves due to the pad being interposed between the belt insert-through portion and the passenger.

In a passenger restraining device for a vehicle relating to a fifth aspect, in the passenger restraining device for a vehicle of the fourth aspect, the pad is set such that ease of bending differs due to absence/presence of plural slits that are formed in the pad at a side of the passenger seated in the vehicle seat in a thickness direction of the pad, or due to a size of the slits.

In accordance with the passenger restraining device for a vehicle relating to the fifth aspect, the pad is set such that the ease of bending thereof differs due to the absence/presence of the plural slits that are formed in the pad at the side of the passenger seated in the vehicle seat, or the size of the slits. The ease of bending of the front side portion and the rear side portion of the belt guide can be adjusted by a simple structure.

In a passenger restraining device for a vehicle relating to a sixth aspect, in the passenger restraining device for a vehicle of the fourth aspect, the pad, the front side portion is formed of a material that is harder than the rear side portion.

In accordance with the passenger restraining device for a vehicle relating to the sixth aspect, the front side portion of the pad is formed of a material that is harder than the rear side portion. The ease of bending of the front side portion and the rear side portion of the belt guide can be adjusted by a simple structure.

In a passenger restraining device for a vehicle relating to a seventh aspect, in the passenger restraining device for a vehicle of the fourth aspect, at the pad, the front side portion is formed to be thicker than the rear side portion.

In accordance with the passenger restraining device for a vehicle relating to the seventh aspect, the front side portion of the pad is formed to be thicker than the rear side portion. The ease of bending of the front side portion and the rear side portion of the belt guide can be adjusted by a simple structure.

In a passenger restraining device for a vehicle relating to an eighth aspect, in the passenger restraining device for a vehicle of the fourth aspect, the pad is set such that ease of bending differs due to an absence or a presence of plural hole portions that are formed in the pad in a thickness direction of the pad, or due to a size of the hole portions.

In accordance with the passenger restraining device for a vehicle relating to the eighth aspect, the pad is set such that the ease of bending thereof differs due to the absence/ presence of the plural hole portions that are formed in the thickness direction, or the size of the hole portions. The ease of bending of the front side portion and the rear side portion of the belt guide can be adjusted by a simple structure.

In a passenger restraining device for a vehicle relating to a ninth aspect, in the passenger restraining device for a vehicle of any one of the fourth through the eighth aspects, at a skin that covers the belt insert-through portion and the pad, a lower surface skin at a side of the passenger who is seated in the vehicle seat is structured by a double-layered fabric, and a lower surface skin at a side contacting the passenger of the double-layered fabric is formed of a fabric whose coefficient of friction is lower than a coefficient of friction of a general portion that structures other portions of the skin.

For example, in a case in which the passenger is wearing clothes of a material having a high coefficient of friction, the clothes and the belt guide do not slide, and the belt guide remains at the chest portion of the seated passenger, and there is the possibility that the belt guide will push the chest portion of the passenger, accompanying the movement of the passenger tilting forward at the time of a front collision.

In contrast, in the passenger restraining device for a vehicle of the ninth aspect, the lower surface skin that is at the side of the passenger who is seated in the vehicle seat is structured by a double-layered fabric, and the lower surface skin at the side contacting the passenger of the double-layered fabric is formed of a fabric whose coefficient of friction is lower than that of the general portion of the skin. Therefore, at the time when the passenger tilts forward during a front collision, the belt guide does not remain at its initial position of contacting the passenger, and moves to a position facing the collarbone of the passenger. Therefore, compressing of the chest portion of the passenger by the belt guide can be reduced.

In a passenger restraining device for a vehicle relating to a tenth aspect, in the passenger restraining device for a vehicle of any one of the fourth through the eighth aspects, at a skin that covers the belt insert-through portion and the pad, a lower surface skin at a side of the passenger who is seated in the vehicle seat is structured by a double-layered fabric, and a lower surface skin at a side contacting the passenger of the double-layered fabric is formed of a fabric that stretches more easily than a general portion that structures other portions of the skin.

In the passenger restraining device for a vehicle of the tenth aspect, the lower surface skin that is at the side of the passenger who is seated in the vehicle seat is structured by a double-layered fabric, and the lower surface skin at the side contacting the passenger of the double-layered fabric is formed of a fabric that stretches more easily than a general portion of the skin. Therefore, the lower surface skin that contacts the passenger stretches, and the belt guide moves toward the collarbone side of the passenger. Thus, compressing of the chest portion of the passenger by the belt guide can be reduced.

In accordance with the passenger restraining device for a vehicle relating to the present disclosure, inputted load can be transmitted from a shoulder belt side to the collarbone of a passenger at the time of a front collision.

DESCRIPTION OF EMBODIMENTS

Figure 1:
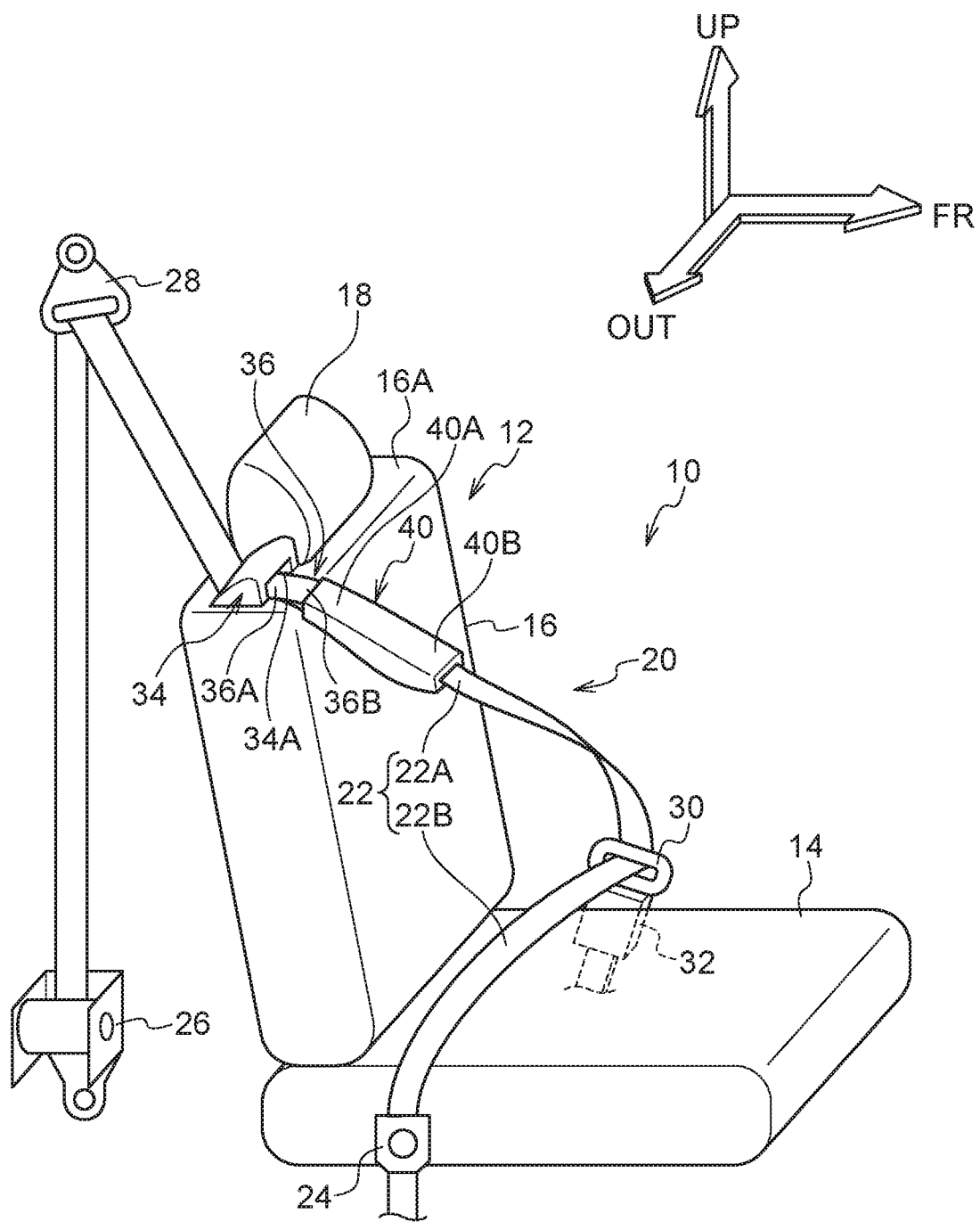
FIG. 1 is a schematic perspective view showing a vehicle seat at which a passenger restraining device for a vehicle relating to a first embodiment is provided.

Embodiments of the present disclosure are described in detail on the basis of the drawings. Note that arrow FR that is shown appropriately in these drawings indicates the vehicle front side, arrow UP indicates the vehicle upper side, and arrow OUT indicates a vehicle transverse direction outer side. Further, arrow L that is shown appropriately in the drawings that show a belt guide indicates the length direction of the belt guide. In the embodiments of the present disclosure, because the seat front side, the seatbelt transverse direction and the seat upper side substantially coincide with the vehicle front side, the vehicle transverse direction and the vehicle upper side respectively, they are uniformly called the vehicle front side, the vehicle transverse direction and the vehicle upper side.

First Embodiment

A passenger restraining device for a vehicle relating to a first embodiment of the present disclosure is described with reference to FIG. 1 through FIG. 6. The respective drawings are schematic, and illustration of portions having little relation to the present disclosure is omitted. Moreover, in FIG. 1, illustration of a passenger P who is described later is omitted.

(Structure of Passenger Restraining Device for Vehicle)

As shown in FIG. 1, a passenger restraining device 10 for a vehicle relating to the first embodiment is provided at a vehicle seat (hereinafter simply called "seat") 12 that is the driver's seat at the vehicle front and right side in the cabin.

The seat 12 has a seat cushion 14 upon which a passenger sits, a seatback 16 that support the back portion of a seated passenger at the rear end portion of the seat cushion 14, and a headrest 18 that is disposed at the upper end portion of the seatback 16 and supports the head portion of the seated passenger. A bezel 34, which serves as the seat shoulder opening and through which a seatbelt (e.g., webbing) 22 that is described later is inserted and guided, is provided at the vehicle transverse direction outer side of an upper portion 16A of the seatback 16.

A seatbelt device 20 that is provided for the seat 12 is an example of a so-called three-point seatbelt device, and has the seatbelt 22, and an anchor plate 24 on which one end of the seatbelt 22 is anchored. Further, the seatbelt device 20 has a retractor 26 with a pretensioner on which the other end of the seatbelt 22 is anchored and that imparts a predetermined tension to the seatbelt 22, and a shoulder anchor 28 at which the seatbelt 22 is folded-back toward the retractor 26 side at an upper portion at the vehicle transverse direction outer side of the seat 12 (e.g., at a pillar). The seatbelt device 20 also has a buckle 32 in which a tongue plate 30, through which the seatbelt 22 is inserted, is fixed due to the tongue plate 30 being fit-together with the buckle 32.

Of the seatbelt 22, the portion from the shoulder anchor 28 to the buckle 32 is called a shoulder belt portion 22A, and the portion from the buckle 32 to the anchor plate 24 is called a lap belt portion 22B. The shoulder belt portion 22A is an example of the shoulder belt.

The shoulder belt portion 22A restrains the passenger P (see FIG. 2), who is seated in the seat 12, from the front from a shoulder portion S that is at the vehicle transverse direction outer side upper portion of the passenger P, obliquely toward a lumbar region L at the vehicle transverse direction inner side lower portion. Here, the vehicle transverse direction outer side of the seat 12 is an example of the seat transverse direction one end side. The vehicle transverse direction inner side of the seat 12 is an example of the seat transverse direction another end side.

Figure 2:
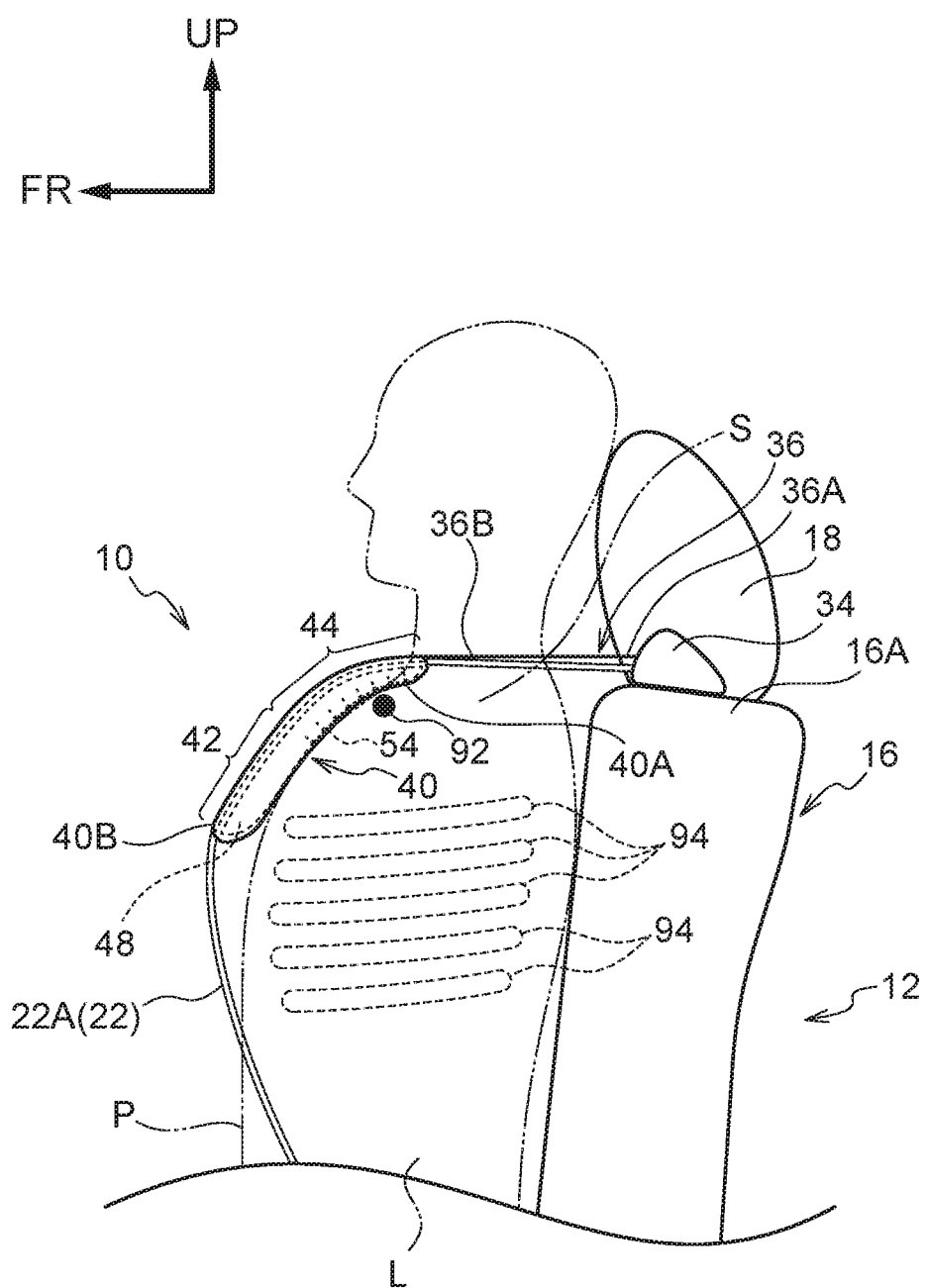
FIG. 2 is a side view showing a state in which a passenger who is seated in a vehicle seat is restrained by the passenger restraining device for a vehicle relating to the first embodiment.

As shown in FIG. 1 and FIG. 2, a belt guide 40 is provided at the passenger restraining device 10 for a vehicle, at the upper portion side of the vehicle transverse direction outer side of the seatback 16. The shoulder belt portion 22A is inserted-through the belt guide 40, and the belt guide 40 is disposed along the restrained surface of the passenger P who is seated in the seat 12 (see FIG. 2). Namely, the belt guide 40 extends from above the vehicle transverse direction outer side of the seatback 16 toward the obliquely lower side at the vehicle transverse direction inner side of the seatback 16. The belt guide 40 is formed in a shape that is long and thin and is along the direction in which the shoulder belt portion 22A is inserted therethrough, as seen in a front view of the seatback 16. Further, the passenger restraining device 10 for a vehicle has a connecting member 36 that serves as a fixed portion that connects and fixes a rear end portion 40A in the length direction of the belt guide 40 (i.e., the upper end portion at the vehicle transverse direction outer side of the belt guide 40) to the bezel 34 that is at the seat transverse direction outer side of the upper portion 16A of the seatback 16.

The bezel 34 has an insert-through hole 34A through which the shoulder belt portion 22A is inserted (see FIG. 1). A length direction one end portion 36A of the connecting member 36 is fixed to a wall portion (e.g., the upper side wall portion) of the insert-through hole 34A of the bezel 34. Further, a length direction another end portion 36B of the connecting member 36 is fixed to the length direction rear end portion 40A of the belt guide 40 (see FIG. 3). At the time of a front collision of the vehicle, the passenger P who is seated in the seat 12 moves toward the vehicle front side with respect to the seatback 16 (see FIG. 5). When, due thereto, tension of a predetermined value or greater is applied to the connecting member 36, the fixing of the bezel 34 and the length direction rear end portion 40A of the belt guide 40 by the connecting member 36 is cancelled. In the first embodiment, the connecting member 36 is belt-shaped. Due to the portion, which is joined to the bezel 34, of the connecting member 36 being severed, the fixing of the bezel 34 and the length direction rear end portion 40A of the belt guide 40 by the connecting member 36 is cancelled (see FIG. 6).

Further, as shown in FIG. 2, a length direction front end portion 40B (i.e., the lower end portion at the vehicle transverse direction inner side) of the belt guide 40 is positioned further toward the vehicle front side (i.e., the vehicle vertical direction lower side) than a collarbone 92 of the passenger P who is seated in the seat 12. The belt guide 40 has a front side portion 42 that structures the length direction front side portion, and a rear side portion 44 that is disposed at the rear side of the front side portion 42 and that structures the length direction rear side portion. In the usual state, the front side portion 42 is disposed further toward the vehicle front side than the collarbone 92 of the passenger P who is seated in the seat 12. The front side portion 42 is structured so as to be hard to bend compared with the rear side portion 44. In other words, it is easier for the rear side portion 44 to bend than the front side portion 42, and, in the usual state (i.e., a state that is not at the time of a front collision), the rear side portion 44 is disposed at a region facing the collarbone 92 of the passenger P seated in the seat 12.

Figure 3:
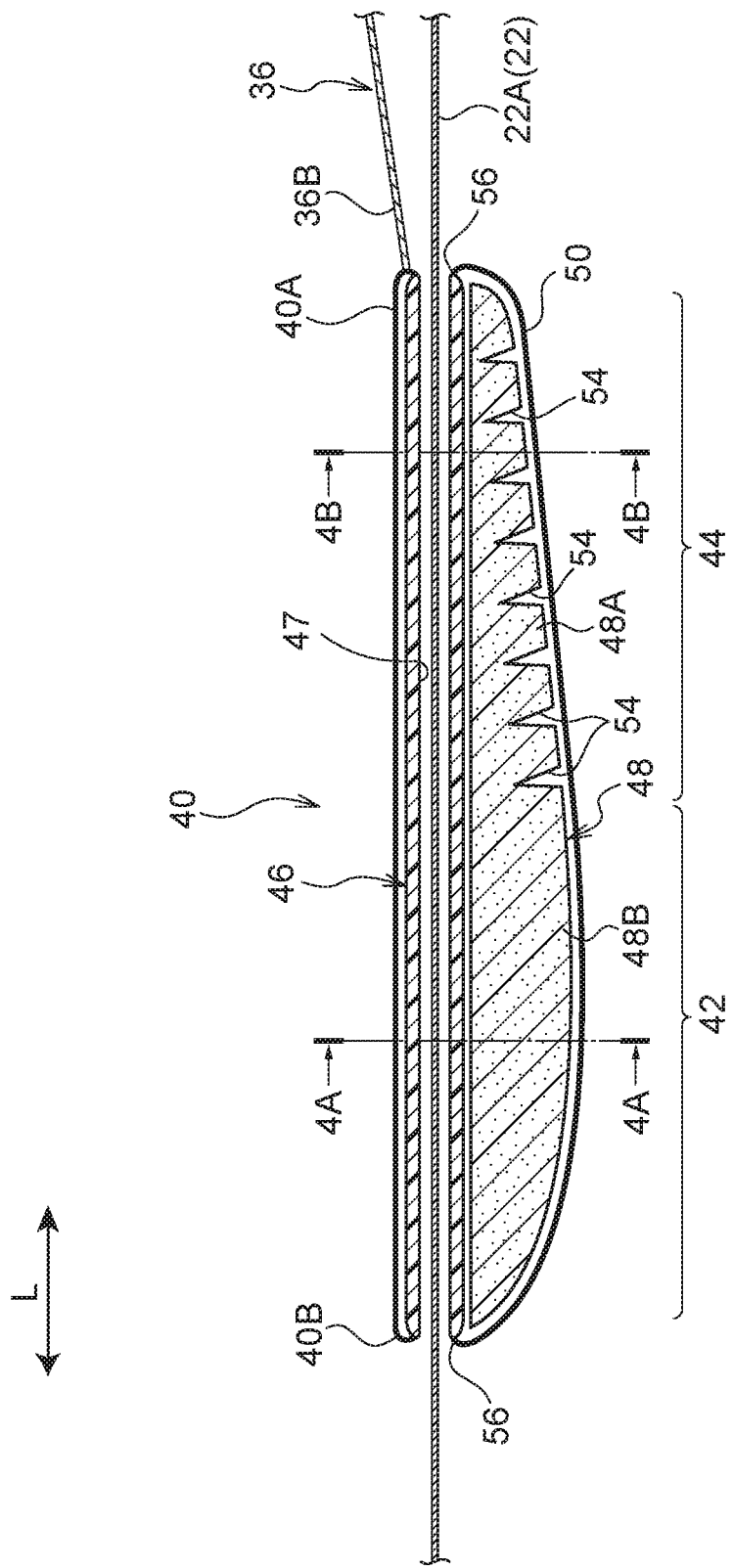
FIG. 3 is an enlarged sectional view, along the length direction of a belt guide that is used in the passenger restraining device for a vehicle relating to the first embodiment, showing a state in which the belt guide is completely straight.
Figure 4A:
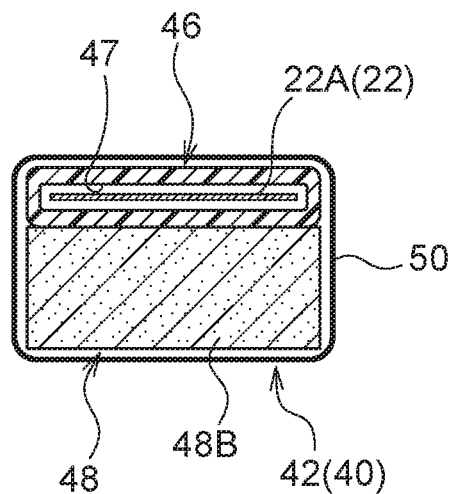
FIG. 4A is a cross-sectional view of the belt guide along line 4A-4A of FIG. 3.
Figure 4B:
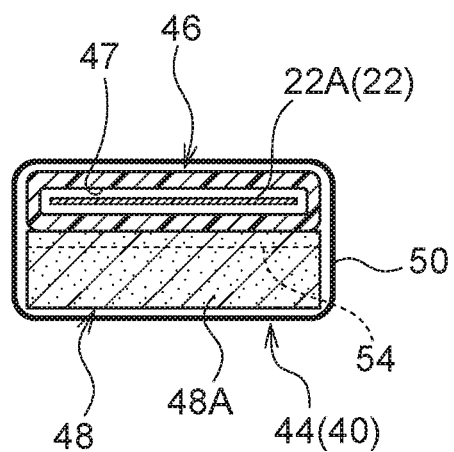
FIG. 4B is a cross-sectional view of the belt guide along line 4B-4B of FIG. 3.

FIG. 3 illustrates a state in which the belt guide 40 is completely straight, in order to make it easy to understand the structure of the belt guide 40. As shown in FIG. 3, FIG. 4A and FIG. 4B, a tubular portion 46, which serves as a belt insert-through portion and through which the shoulder belt portion 22A is inserted, and a pad 48, which is disposed between the passenger P (see FIG. 2) seated in the seat 12 and the shoulder belt portion 22A (i.e., the tubular portion 46), are provided at the interior of the belt guide 40. In other words, the pad 48 is disposed between the passenger P (see FIG. 2) who is seated in the seat 12 and the tubular portion 46. A skin 50, which is shaped as a bag and covers the tubular portion 46 and the pad 48, is provided at the surface of the belt guide 40.

As shown in FIG. 3, the tubular portion 46 is disposed along the length direction of the belt guide 40 (i.e., the arrow L direction shown in FIG. 3). The tubular portion 46 is formed substantially in the shape of a rectangular tube as seen in a cross-section in the direction orthogonal to the length direction of the shoulder belt portion 22A (refer to FIG. 4A and FIG. 4B). An insert-through hole 47 that passes-through in the length direction of the belt guide 40 is formed in the tubular portion 46, and the shoulder belt portion 22A is inserted-through this insert-through hole 47. Namely, the tubular portion 46 is disposed so as to surround the shoulder belt portion 22A, and the shoulder belt portion 22A slides along the length direction of the tubular portion 46. The tubular portion 46 is, for example, formed from a low-friction resin, and the sliding resistance of the tubular portion 46 is lowered in order for pulling-out and taking-up of the shoulder belt portion 22A to be carried-out smoothly. The tubular portion 46 can bendingly deform in a direction intersecting the length direction (i.e., in the thickness direction of the tubular portion 46).

The pad 48 extends along the tubular portion 46 of the belt guide 40. The pad 48 has a front side portion 48B that corresponds to the front side portion 42 of the belt guide 40, and a rear side portion 48A that corresponds to the rear side portion 44 of the belt guide 40. At the pad 48, the thickness of the rear side portion 48A side of the front side portion 48B (i.e., the thickness corresponding to the thickness direction of the shoulder belt portion 22A) is thicker than the thickness of the front side portion 48B side of the rear side portion 48A. In other words, the pad 48 is structured such that the average of the thicknesses of the front side portion 48B is thicker than the average of the thicknesses of the rear side portion 48A. The thickness of the front side portion 48B of the pad 48 is formed so as to become gradually thinner from the length direction intermediate portion toward the front side. The thickness of the rear side portion 48A of the pad 48 is formed so as to become gradually thinner toward the length direction rear side. The pad 48 is formed from a resin that is flexible, such as a foamed resin or the like for example. The pad 48 is joined to the tubular portion 46 by adhesion or the like for example, such that the position of the pad 48 at the interior of the belt guide 40 does not become offset.

Plural slits 54 that are lined-up in the length direction of the pad 48 are formed in the rear side portion 48A of the pad 48 at the side of the passenger P (see FIG. 2) who is seated in the seat 12, i.e., at the side facing the skin 50. In other words, the plural slits 54 are formed in the rear side portion 48A of the pad 48, at the side thereof that is opposite the tubular portion 46. The slits 54 are formed at a portion in the thickness direction of the pad 48. The slits 54 are formed in the shapes of upside-down V's such that, for example, the widths of the slits 54 at the side facing the skin 50 (i.e., the widths along the length direction of the shoulder belt portion 22A) become gradually larger than the widths at the tubular portion 46 side. The depths of the plural slits 54 are formed to be, for example, in the range of around ½ to ⅓ of the thickness of the rear side portion 48A of the pad 48. Slits are not formed in the front side portion 48B of the pad 48.

Due to the plural slits 54 being provided in the rear side portion 48A of the pad 48, it is easy for the rear side portion 48A to bend toward the skin 50 side which is the direction in which the gaps of the slits 54 become more narrow, i.e., it is easy for the rear side portion 48A to bend toward the side opposite the tubular portion 46. Therefore, as compared with the front side portion 48B of the pad 48, it is easy for the rear side portion 48A of the pad 48 to bend toward the side opposite the tubular portion 46. Due thereto, it is easy for the rear side portion 44 of the belt guide 40, which corresponds to the rear side portion 48A of the pad 48, to bend along the restrained surface of the passenger P (see FIG. 2) who is seated in the seat 12. For example, even in a case in which the rear side portion 44 of the belt guide 40 moves to a position facing the curved portion of the shoulder portion S of the passenger P (see FIG. 2) who is seated in the seat 12, the rear side portion 44 of the belt guide 40 (i.e., the rear side portion 48A of the pad 48) bends (see FIG. 6) along the shoulder portion S of the passenger P (see FIG. 2) who is seated in the seat 12.

Due to slits not being provided in the front side portion 48B of the pad 48, it is difficult for the front side portion 48B to bend toward the skin 50 side, i.e., toward the side opposite the tubular portion 46, as compared with the rear side portion 48A of the pad 48. For example, it is difficult for the front side portion 48B of the pad 48 to bend along the curved portion of the shoulder portion S of the passenger P (see FIG. 2) who is seated in the seat 12, and it is difficult for the front side portion 42 of the belt guide 40, which corresponds to the front side portion 48B of the pad 48, to move toward the shoulder portion S side of the passenger P (see FIG. 2).

Opening portions 56 through which the shoulder belt portion 22A is inserted are provided in the skin 50, at the rear end portion 40A side and the front end portion 40B side of the belt guide 40 (see FIG. 3). The skin 50 is formed, for example, of a fabric in which fibers are woven or a flexible resin, and the skin 50 rubbing against the passenger P (see FIG. 2) is prevented or suppressed.

The another end portion 36B of the connecting member 36 is fixed to the rear end portion 40A of the belt guide 40 (see FIG. 3). In the first embodiment, the another end portion 36B of the connecting member 36 is attached to the skin 50 of the rear end portion 40A of the belt guide 40, but the another end portion 36B may be attached to the tubular portion 46 of the belt guide 40.

(Operation and Effects)

Operation and effects of the passenger restraining device 10 for a vehicle of the first embodiment are described next.

In the passenger restraining device 10 for a vehicle, the rear end portion 40A in the length direction of the belt guide 40 is fixed to the bezel 34, which is at the seat transverse direction outer side of the upper portion 16A of the seatback 16, by the connecting member 36. When the passenger P who is seated in the seat 12 wears the seatbelt 22 of the seatbelt device 20, the shoulder belt portion 22A moves relatively along the belt guide 40 in accordance with the operations of putting-on/taking-off the seatbelt 22 and the changes in the posture of the passenger P. The front side portion 42 in the length direction of the belt guide 40 is structured so as to be difficult to bend as compared with the rear side portion 44 in the length direction of the belt guide 40. As shown in FIG. 2, in the usual state (i.e., a state not at the time of a front collision), the front side portion 42 is disposed further toward the vehicle front side than the collarbone 92 of the passenger P who is seated in the seat 12. Due thereto, the rear side portion 44, which bends more easily than the front side portion 42, of the belt guide 40 is disposed at a position facing the collarbone 92 of the passenger P.

Figure 5:
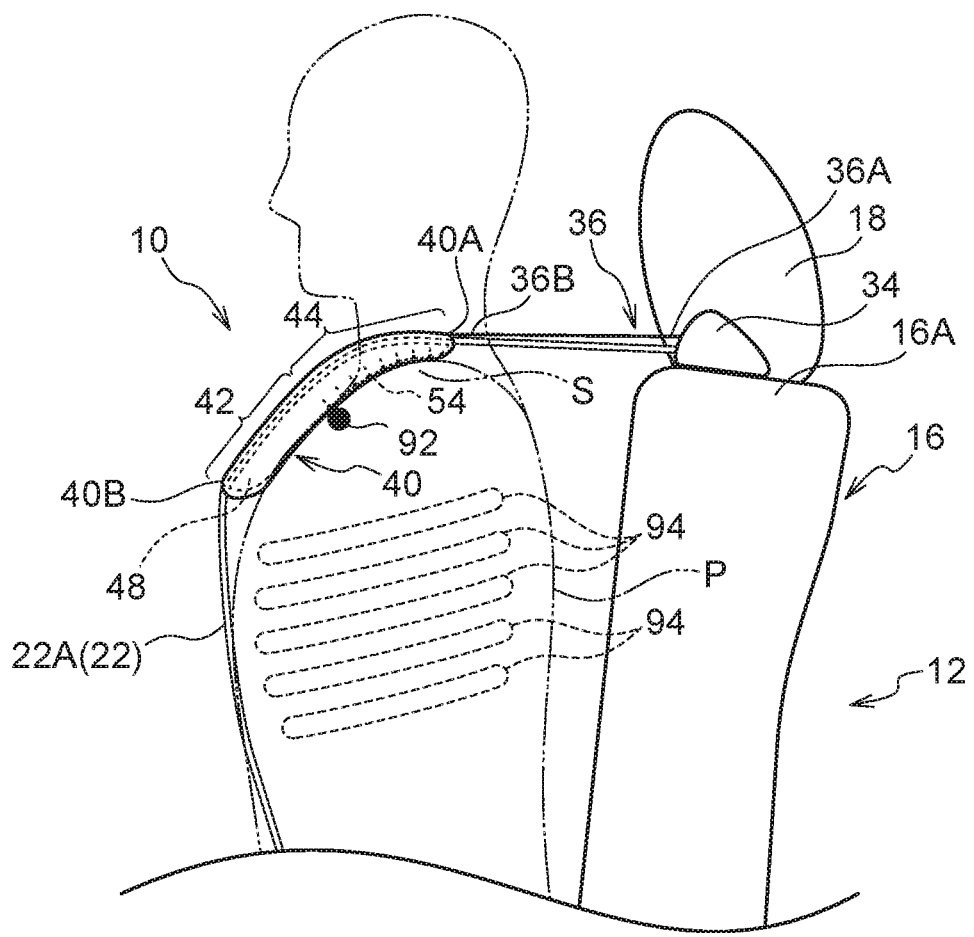
FIG. 5 is a side view showing a state in which relative positions of the passenger and the belt guide shift in an initial stage of a front collision, at the passenger restraining device for a vehicle relating to the first embodiment.

As shown in FIG. 5, when, at the time of a front collision, the passenger P who is seated in the seat 12 moves toward the vehicle front side with respect to the seatback 16, the belt guide 40 shifts toward the vehicle upper side and the vehicle rear side with respect to the passenger P. Namely, because the belt guide 40 is fixed by the connecting member 36 to the bezel 34 of the upper portion 16A of the seatback 16, the belt guide 40 shifts toward the vehicle upper side and the vehicle rear side with respect to the passenger P, due to the movement of the passenger P toward the vehicle front side. At this time, the rear side portion 44 of the belt guide 40 bends easily as compared with the front side portion 42, and the rear side portion 44 of the belt guide 40 bends along the curved portion of the shoulder portion S of the passenger P. On the other hand, because it is hard for the front side portion 42 of the belt guide 40 to bend as compared with the rear side portion 44, it is difficult for the front side portion 42 to pass the curved portion of the shoulder portion S of the passenger P.

Figure 6:
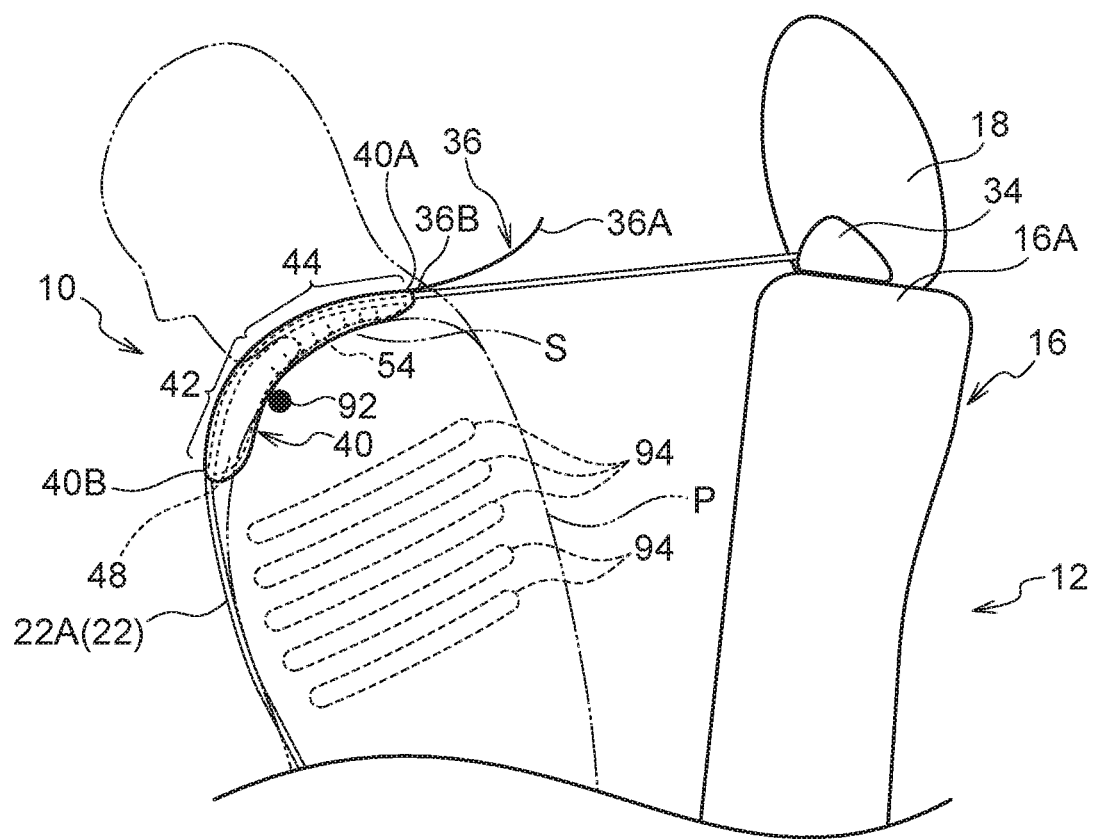
FIG. 6 is a side view showing a state of the belt guide at which a fixing portion is severed in the latter half of a front collision, at the passenger restraining device for a vehicle relating to the first embodiment.

As shown in FIG. 6, in the latter half of a front collision, when the passenger P moves further toward the vehicle front side with respect to the seatback 16 and tension of a predetermined value or greater is applied to the connecting member 36, the one end portion 36A of the connecting member 36 is severed, and the fixing of the bezel 34 and the rear end portion 40A of the belt guide 40 is cancelled. At this time, it is difficult for the front side portion 42 of the belt guide 40 to pass the curved portion of the shoulder portion S of the passenger P, and the front side portion 42 cannot move further than that along the shoulder belt portion 22A and stays at the front side of the shoulder portion S of the passenger P. Therefore, regardless of the physique or the seated posture of the passenger P, the belt guide 40 self-fits at an appropriate position of the passenger P, and the front side portion 42 of the belt guide 40 is disposed at a region facing the collarbone 92 of the passenger P. Due thereto, the collarbone 92 of the passenger P can be pushed by the front side portion 42 of the belt guide 40. Accordingly, at the time of a front collision, load that is inputted to the passenger P can be transmitted from the shoulder belt portion 22A to the collarbone 92 whose resistance is higher than that of ribs 94.

Further, at the passenger restraining device 10 for a vehicle, due to the front side portion 42 of the belt guide 40 being disposed at a region facing the collarbone 92 of the passenger P, the load to the ribs 94, whose resistance is low relative to that of the collarbone 92, can be lowered. Therefore, the occurrence of chest flexure (i.e., rib flexure), in which a vicinity of the ribs 94 of the passenger P deforms, is suppressed or prevented.

Further, at the passenger restraining device 10 for a vehicle, when tension of a predetermined value or more is applied to the connecting member 36, the fixing of the bezel 34 and the length direction rear end portion 40A of the belt guide 40 by the connecting member 36 is cancelled. In the first embodiment, due to the joined portion of the bezel 34 and the one end portion 36A of the connecting member 36 being severed, the fixing of the bezel 34 and the length direction rear end portion 40A of the belt guide 40 by the connecting member 36 is canceled. Due thereto, the belt guide 40 can be moved toward the vehicle front side with respect to the bezel 34 of the upper portion 16A of the seatback 16. Therefore, in the latter half of a collision as well, the belt guide 40 can be disposed at an appropriate position of the passenger P, i.e., at a region where the front side portion 42 of the belt guide 40 faces the collarbone 92 of the passenger P.

Further, in the passenger restraining device 10 for a vehicle, at the belt guide 40, the pad 48 is disposed at the side of the passenger P who is seated in the seat 12, with respect to the tubular portion 46 through which the shoulder belt portion 22A is inserted. Due thereto, the comfort at the time when the passenger P wears the seatbelt 22 is improved due to the pad 48 being interposed between the tubular portion 46 and the passenger P.

Further, in the passenger restraining device 10 for a vehicle, the pad 48 is set such that the ease of bending of the rear side portion 48A and the front side portion 48B are different due to the absence/presence of the plural slits 54 that are formed in the pad 48 at the side of the passenger P who is seated in the seat 12. In the first embodiment, the plural slits 54 are provided in the rear side portion 48A of the pad 48, and slits are not provided in the front side portion 48B. Due thereto, it is more difficult for the front side portion 48B of the pad 48 to bend than the rear side portion 48A. Further, by making the average of the thicknesses of the front side portion 48B of the pad 48 be thicker than the average of the thicknesses of the rear side portion 48A of the pad 48, the front side portion 48B of the pad 48 is structured to be even more difficult to bend than the rear side portion 48A. Thus, adjustment of the ease of bending of the front side portion 42 and the rear side portion 44 of the belt guide 40 is possible by a simple structure.

Figure 11:
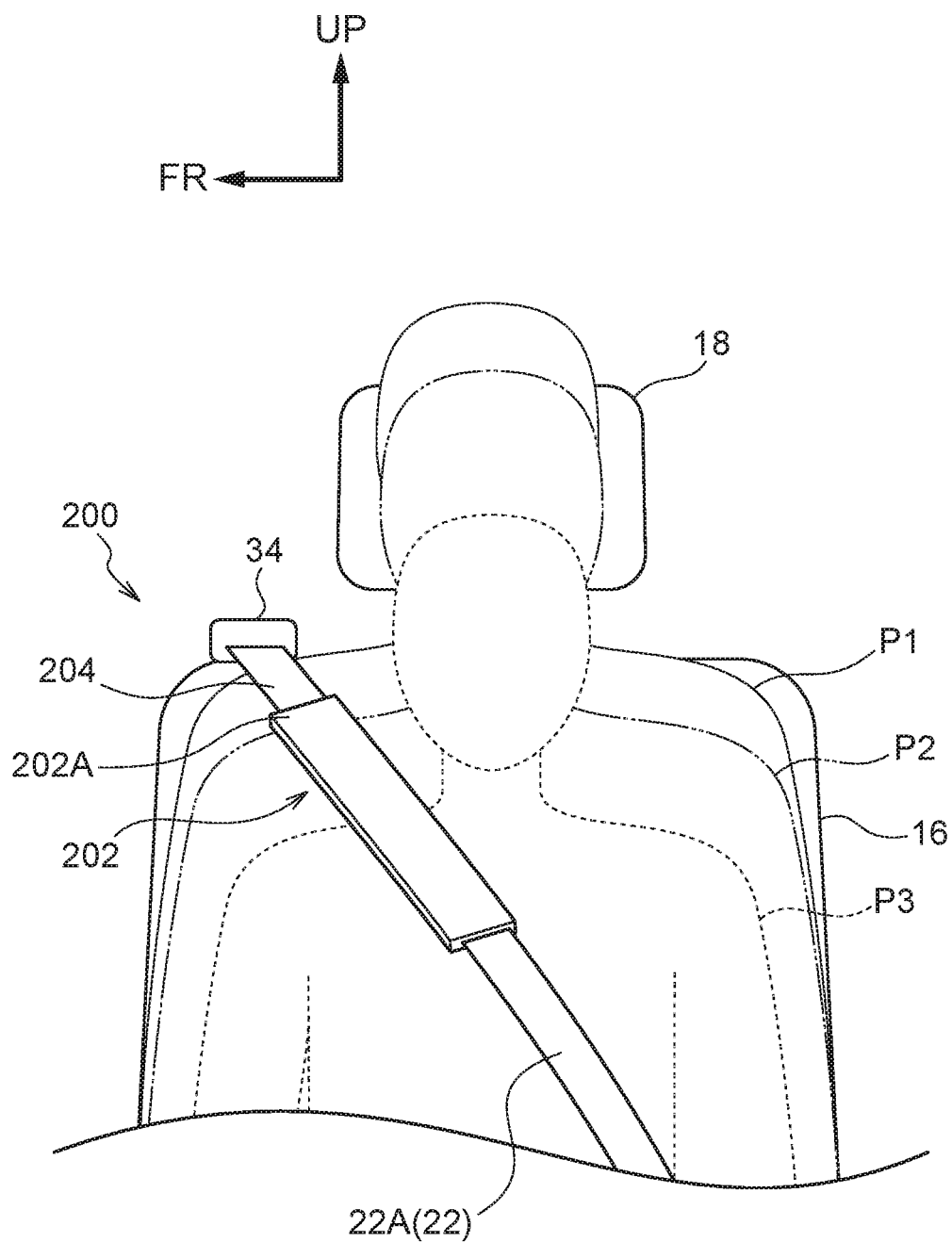
FIG. 11 is a schematic front view showing states in which passengers of plural different physiques who are seated in the vehicle seat are restrained by a passenger restraining device for a vehicle of a comparative example.
Figure 12:
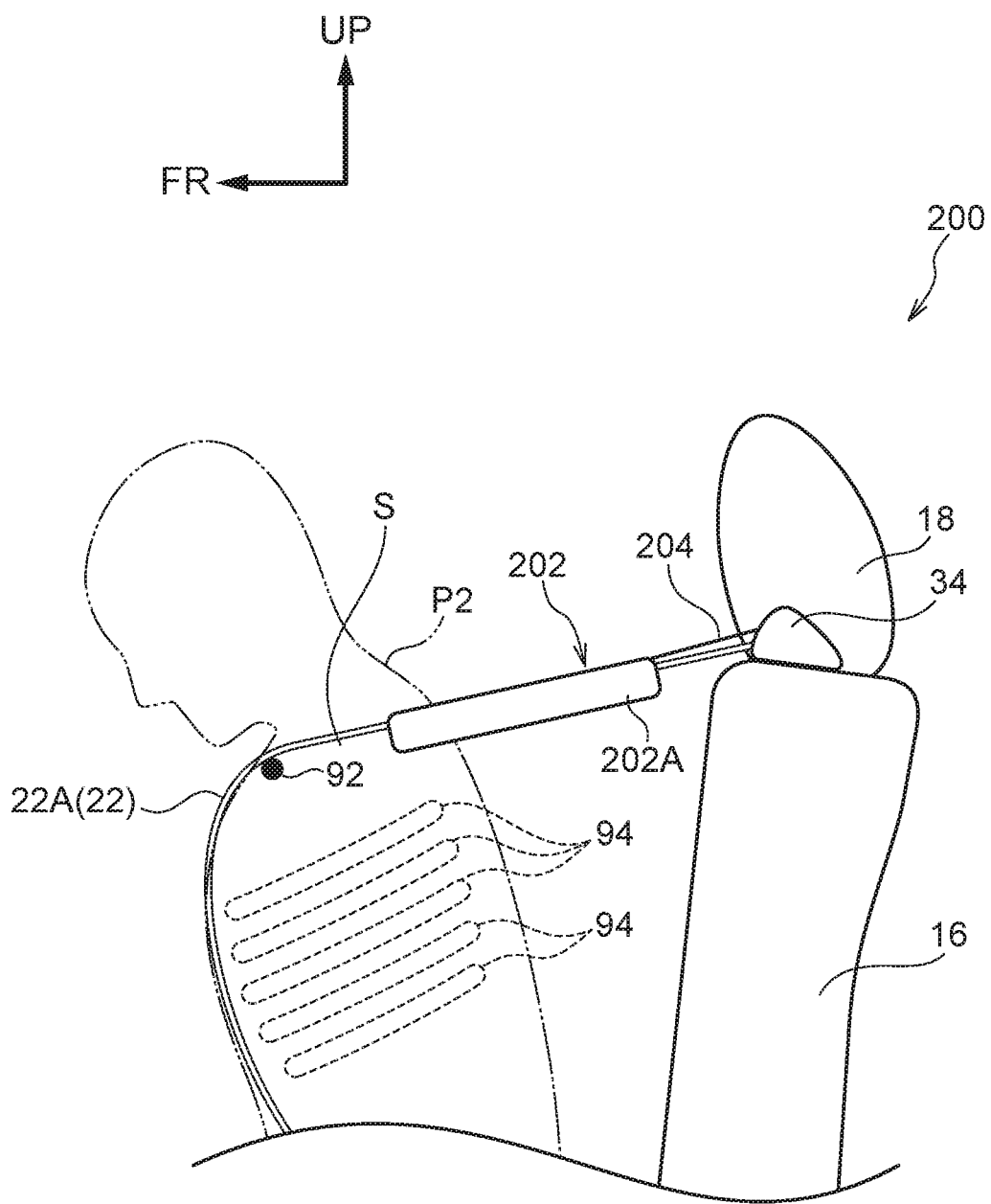
FIG. 12 is a side view showing a state in which a belt guide has shifted toward the rear side of the shoulder portion of the passenger at the time of a front collision, in the passenger restraining device for a vehicle of the comparative example.

A passenger restraining device 200 for a vehicle of a comparative example is shown in schematic structural views in FIG. 11 and FIG. 12. As shown in FIG. 11 and FIG. 12, at the passenger restraining device 200 for a vehicle, a belt guide 202 through which the shoulder belt portion 22A is inserted is provided at the vertical direction upper portion side of the shoulder belt portion 22A. Although not illustrated, a pad, which has a uniform structure along the length direction, is provided at the interior of the belt guide 202. Further, the passenger restraining device 200 for a vehicle has a fixing member 204 that is belt-shaped and that fixes a length direction rear end portion 202A of the belt guide 202 to the bezel 34 that is at the upper portion of the seatback 16. The fixing member 204 is structured so as to not be severed even if tension of a predetermined value or greater is applied thereto. Therefore, at the time of a front collision, the fixing of the bezel 34 and the length direction rear end portion 202A of the belt guide 202 by the fixing member 204 is not cancelled.

As shown in FIG. 11, in cases in which passengers P1, P2, P3 who have different physiques are seated at the seatback 16 of the vehicle seat, the position of the belt guide 202 changes with respect to the passengers P1, P2, P3 of the different physiques. For example, passenger P1 is an AM95 dummy that models a male passenger of a large physique, passenger P2 is an AM50 dummy that models a male passenger of a standard physique, and passenger P3 is an AF05 dummy who models a female passenger of a small physique. At the passenger restraining device 200 for a vehicle, the rear end portion 202A of the belt guide 202 is fixed by the fixing member 204 to the bezel 34 that is at the upper portion of the seatback 16. Therefore, due to differences in the physiques of and differences in the seated postures of the passengers P1, P2, P3, the belt guide 202 moves to various positions with respect to the passengers P1, P2, P3, and the belt guide 202 cannot be worn at appropriate positions for all.

The state of passenger P2, who is seated at the seatback 16 of the vehicle seat at the time of a front collision of the vehicle, is shown in FIG. 12. As shown in FIG. 12, when, at the time of a front collision of the vehicle, the passenger P2 moves toward the vehicle front side with respect to the seatback 16, the belt guide 202 cannot follow the movement of the passenger P2, and the belt guide 202 is disposed at the rear side of the shoulder portion S of the passenger P. Therefore, the belt guide 202 comes away from a region facing the collarbone 92 of the passenger P, and the belt guide 202 cannot push the collarbone 92 of the passenger P. Therefore, in the passenger restraining device 200 for a vehicle of the comparative example, it is difficult for load to be stably transmitted to the collarbone 92 of the passenger P by the belt guide 202. Note that, in FIG. 12, only the passenger P2 is illustrated in order to make the structure of the passenger restraining device 200 for a vehicle easy to understand.

In contrast, in the passenger restraining device 10 for a vehicle of the first embodiment, it is difficult for the front side portion 42 of the belt guide 40 to bend, as compared with the rear side portion 44. Therefore, it is difficult for the front side portion 42 to pass the curved portion of the shoulder portion S of the passenger P, and the front end portion 42 cannot move along the shoulder belt portion 22A and stays at the front side of the shoulder portion S of the passenger P. Therefore, regardless of the physique and the seated posture of the passenger P, the belt guide 40 self-fits to an appropriate position of the passenger P, and load can be transmitted stably to the collarbone 92 of the passenger P at the front side portion 42 of the belt guide 40.

Second Embodiment

A passenger restraining device 70 for a vehicle of a second embodiment is described next by using FIG. 7. Note that structural portions that are the same as those of the above-described first embodiment are denoted by the same reference numerals, and description thereof is omitted.

Figure 7:
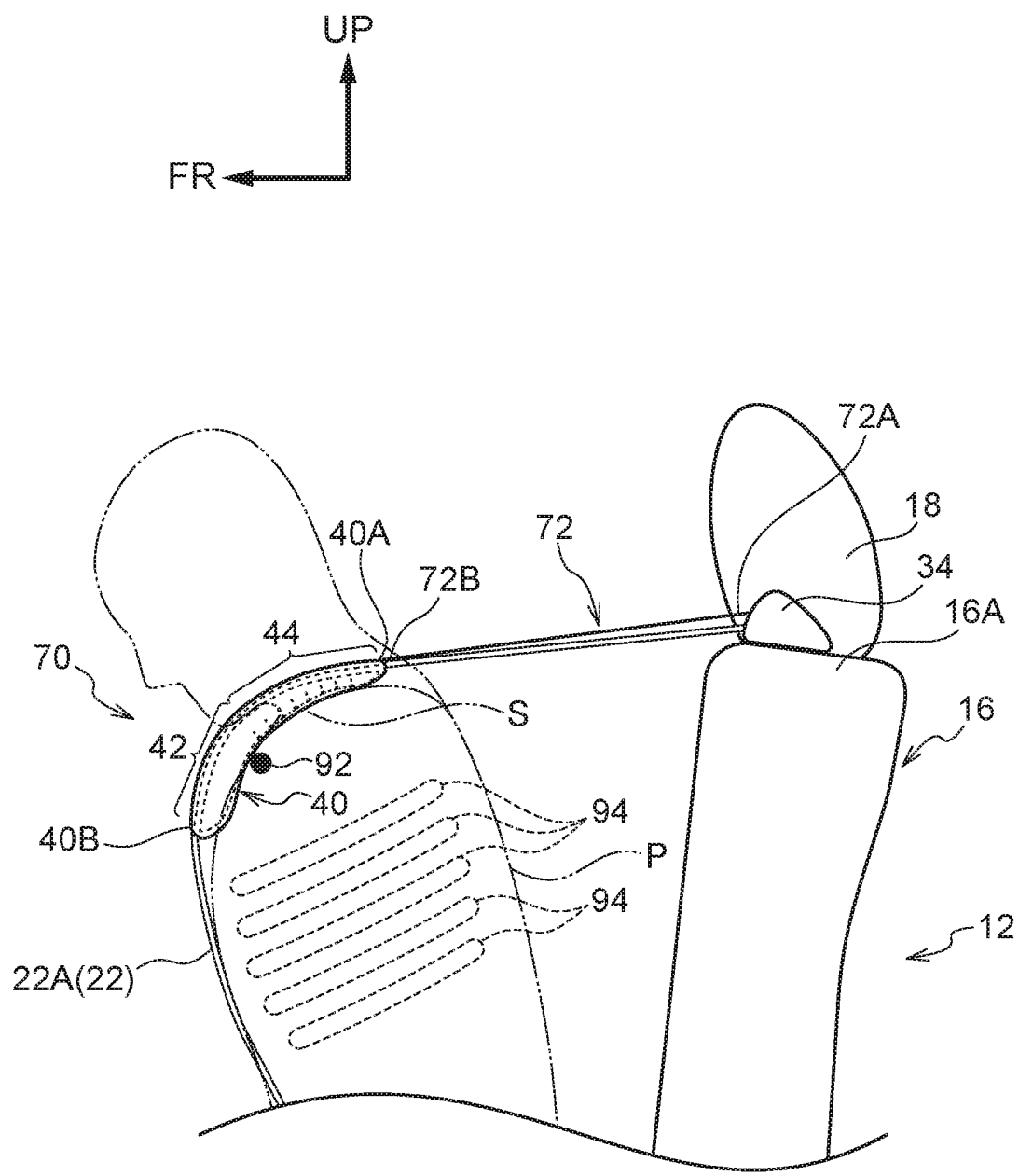
FIG. 7 is a side view showing a state of the belt guide at which the fixing portion has extended in the latter half of a front collision, at a passenger restraining device for a vehicle relating to a second embodiment.

The state, at the latter half of a front collision, of the passenger restraining device 70 for a vehicle of the second embodiment is shown in FIG. 7. As shown in FIG. 7, the passenger restraining device 70 for a vehicle has an extensible member 72 that serves as the fixing portion and that connects and fixes the length direction rear end portion 40A of the belt guide 40 to the bezel 34 that is at the seat transverse direction outer side of the upper portion 16A of the seatback 16. A length direction one end portion 72A of the extensible member 72 is attached to the bezel 34, and a length direction another end portion 72B of the extensible member 72 is attached to the length direction rear end portion 40A of the belt guide 40. The extensible member 72 is formed of a fabric that extends more easily than the shoulder belt portion 22A. When tension of a predetermined value or greater is applied, the extensible member 72 extends in accordance with the distance between the bezel 34 and the length direction rear end portion 40A of the belt guide 40.

As shown in FIG. 7, at the passenger restraining device 70 for a vehicle, when tension of a predetermined value or greater is applied to the extensible member 72 in the latter half of a front collision, the extensible member 72 extends in accordance with the distance between the bezel 34 and the length direction rear end portion 40A of the belt guide 40. It is difficult for the front side portion 42 of the belt guide 40 to pass the curved portion of the shoulder portion S of the passenger P, and the front side portion 42 cannot move further than that along the shoulder belt portion 22A and stays at the front side of the shoulder portion S of the passenger P. Therefore, regardless of the physique of or the seated posture of the passenger P, the belt guide 40 self-fits to an appropriate position of the passenger P, and the front side portion 42 of the belt guide 40 is disposed at a region facing the collarbone 92 of the passenger P. Accordingly, at the time of a front collision, load that is inputted to the passenger P can be transmitted from the shoulder belt portion 22A to the collarbone 92 that has higher resistance than the ribs 94.

Third Embodiment

A passenger restraining device 100 for a vehicle of a third embodiment is described next by using FIG. 8. Note that structural portions that are the same as those of the above-described first and second embodiments are denoted by the same reference numerals, and description thereof is omitted.

Figure 8:
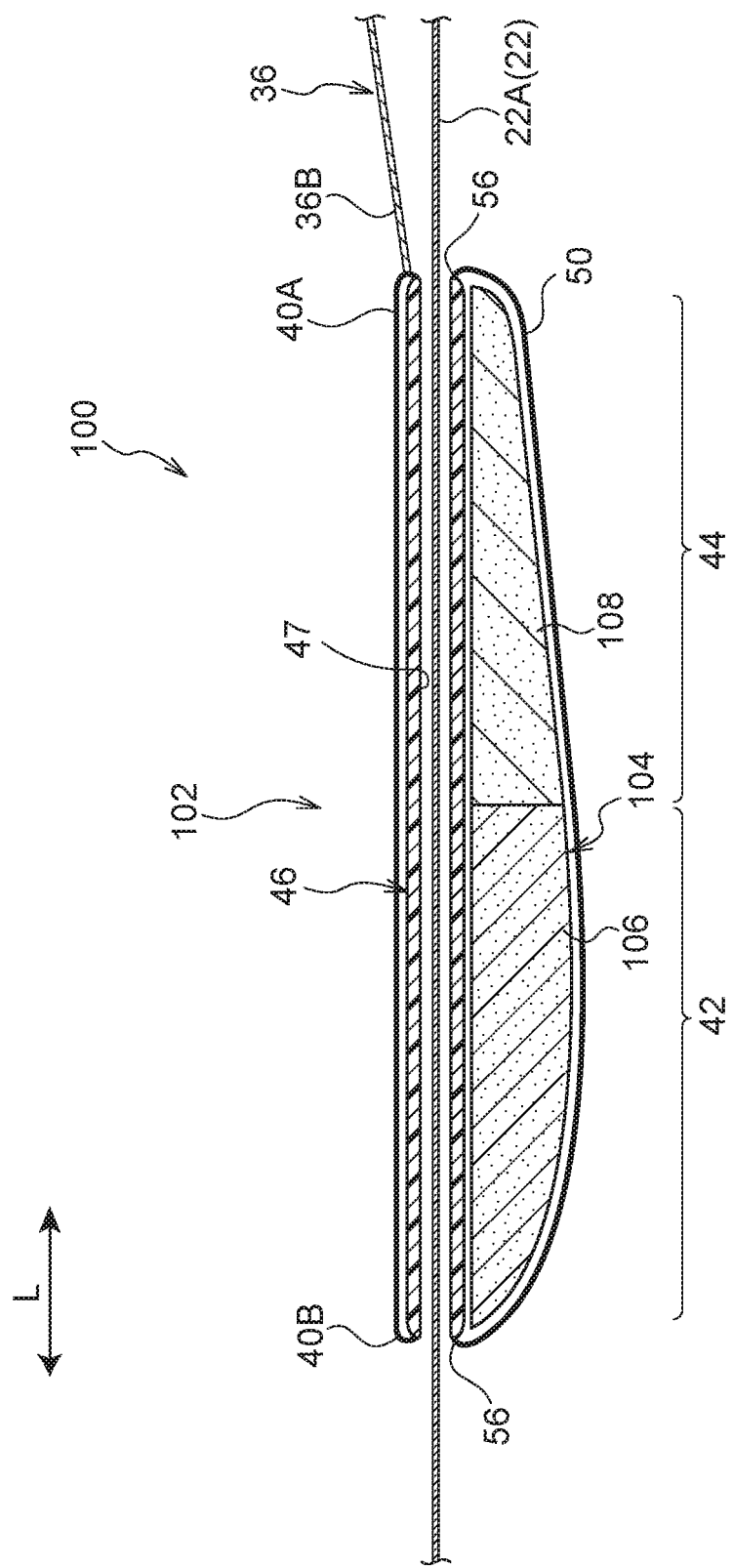
FIG. 8 is an enlarged sectional view, along the length direction of a belt guide that is used in a passenger restraining device for a vehicle relating to a third embodiment, showing a state in which the belt guide is completely straight.

As shown in FIG. 8, a belt guide 102 is provided at the passenger restraining device 100 for a vehicle. A pad 104 is provided within the belt guide 102 along the tubular portion 46 through which the shoulder belt portion 22A is inserted. Although not illustrated, the pad 104 is disposed at the side of the passenger who is seated in the seat. The pad 104 has a hard pad 106 that is disposed at a position corresponding to the front side portion 42 of the belt guide 102, and a soft pad 108 that is softer than the hard pad 106 and that is disposed at a position corresponding to the rear side portion 44 of the belt guide 40. In other words, the hard pad 106 that is at the front portion side of the pad 104 is formed of a material that is harder than the soft pad 108 that is at the rear portion side of the pad 104. For example, the hard pad 106 is structured by a foamed resin whose foaming magnification is low, and the soft pad 108 is structured by a foamed resin whose foaming magnification is higher than that of the hard pad 106. Here, foaming magnification means the value obtained by dividing the density of the resin material before foaming by the apparent density of the foam after foaming (e.g., the pad).

Due to the hard pad 106 being formed of a material that is harder than the soft pad 108, it is more difficult for the hard pad 106 to bend than the soft pad 108. Therefore, it is more difficult for the front side portion 42 of the belt guide 40 to bend than the rear side portion 44 of the belt guide 40. The hard pad 106 and the soft pad 108 may, for example, be joined to the tubular portion 46 by adhesion or the like such that the positions thereof within the belt guide 102 do not become offset.

At the passenger restraining device 100 for a vehicle, although not illustrated, because it is more difficult for the front side portion 42 of the belt guide 102 to bend than the rear side portion 44, at the time of a front collision, the front side portion 42 which is difficult to bend cannot pass the curved portion of the shoulder portion S (see FIG. 5 and FIG. 6) of the passenger P seated in the seat, and stays at the front side of the shoulder portion S of the passenger P. Therefore, regardless of the physique of and the seated posture of the passenger P, the belt guide 102 self-fits at an appropriate position of the passenger, and can push the collarbone of the passenger by the front side portion 42 of the belt guide 102. Accordingly, at the passenger restraining device 100 for a vehicle, load to the passenger P can be transmitted from the shoulder belt portion 22A to the collarbone that has high resistance.

Further, at the passenger restraining device 100 for a vehicle, the hard pad 106, which is at the front side portion in the length direction of the pad 104, is formed of a material that is harder than the soft pad 108 that is at the rear side portion in the length direction of the pad 104. Therefore, the ease of bending of the front side portion 42 and the rear side portion 44 of the belt guide 102 can be adjusted by a simple structure.

Fourth Embodiment

A passenger restraining device 120 for a vehicle of a fourth embodiment is described next by using FIG. 9 and FIG. 10. Note that structural portions that are the same as those of the above-described first through third embodiments are denoted by the same reference numerals, and description thereof is omitted.

Figure 9:
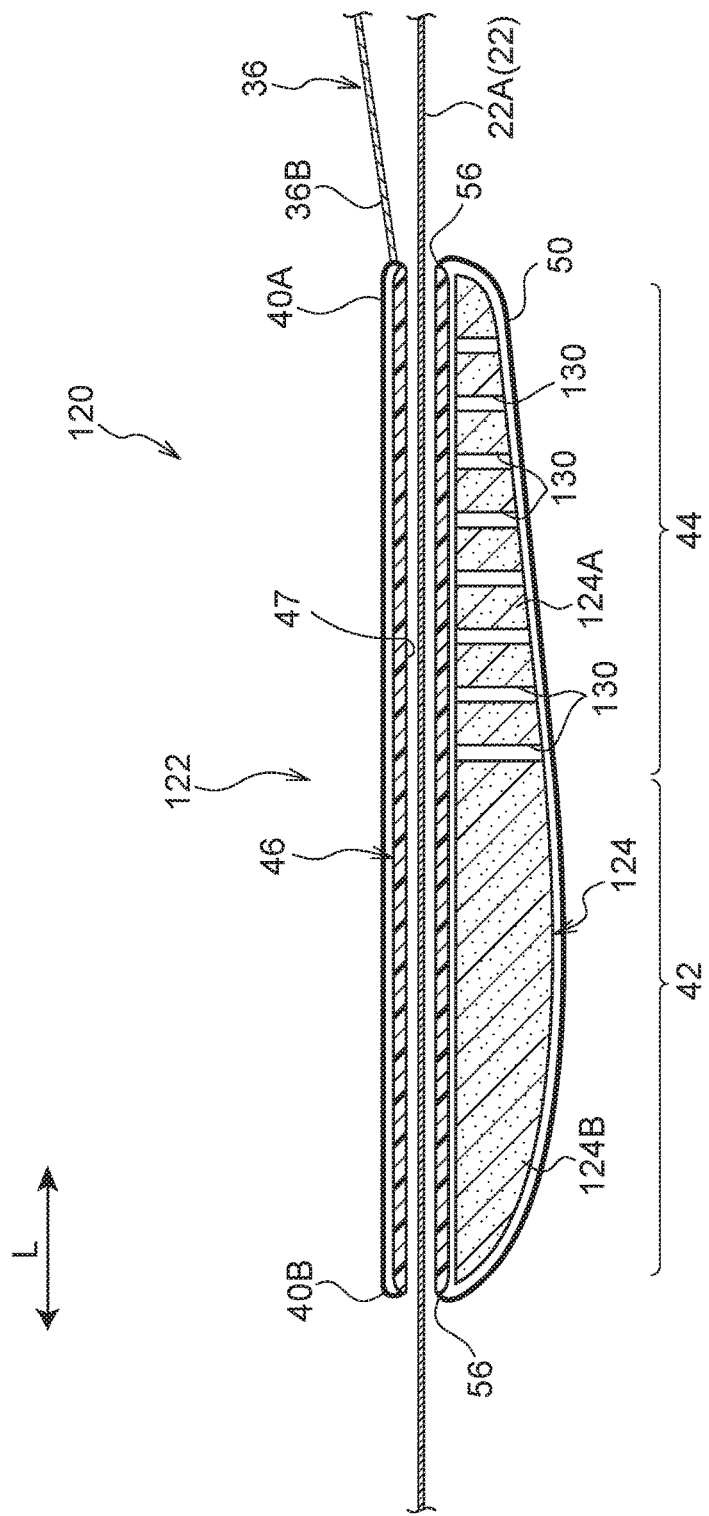
FIG. 9 is an enlarged sectional view, along the length direction of a belt guide that is used in a passenger restraining device for a vehicle relating to a fourth embodiment, showing a state in which the belt guide is completely straight.
Figure 10:
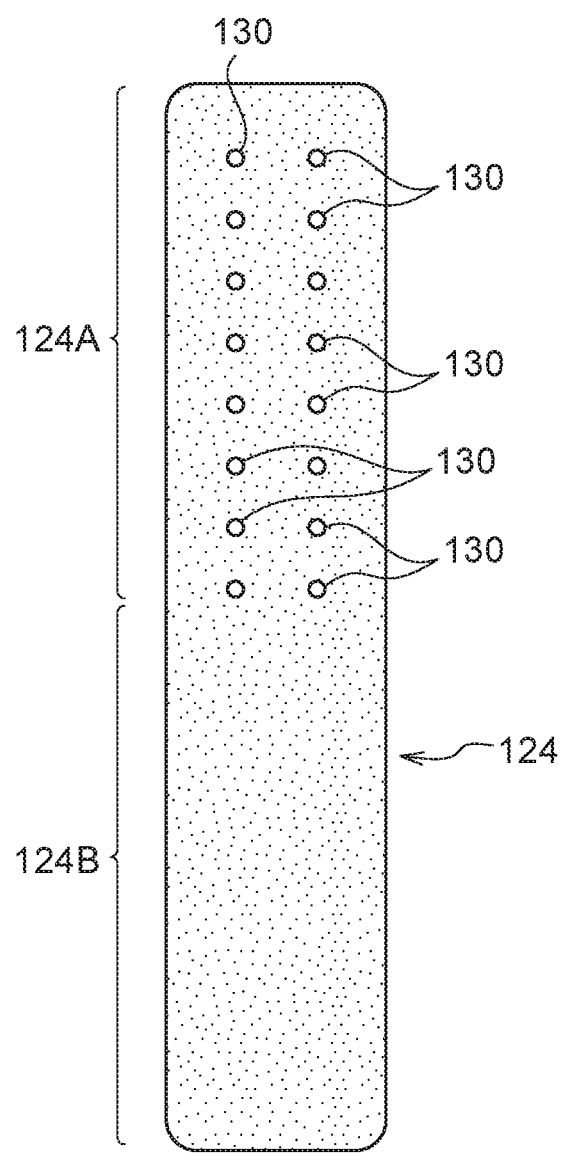
FIG. 10 is an enlarged front view showing a pad, by itself, of the belt guide that is used in the passenger restraining device for a vehicle relating to the fourth embodiment.

As shown in FIG. 9, a belt guide 122 is provided at the passenger restraining device 120 for a vehicle. A pad 124 is provided within the belt guide 122 along the tubular portion 46 through which the shoulder belt portion 22A is inserted. Although not illustrated, the pad 124 is disposed at the side of the passenger who is seated in the seat. The pad 124 has a front side portion 124B that corresponds to the front side portion 42 of the belt guide 122, and a rear side portion 124A that corresponds to the rear side portion 44 of the belt guide 122. As shown in FIG. 9 and FIG. 10, plural hole portions 130, which pass-through in the thickness direction of the rear side portion 124A of the pad 124, are formed in the rear side portion 124A. The plural hole portions 130 are disposed, for example, in a direction intersecting the length direction of the pad 124. In the fourth embodiment, the plural hole portions 130 are disposed in two rows in the direction orthogonal to the length direction of the pad 124. Hole portions are not provided in the front side portion 124B of the pad 124.

Due to the plural hole portions 130 being formed in only the rear side portion 124A of the pad 124, it is more difficult for the front side portion 124B of the pad 124 to bend than the rear side portion 124A of the pad 124. Therefore, it is more difficult for the front side portion 42 of the belt guide 122 to bend than the rear side portion 44 of the belt guide 122. The pad 124 is joined to the tubular portion 46 by adhesion or the like for example, such that the position of the pad 124 at the interior of the belt guide 122 does not become offset.

In the passenger restraining device 120 for a vehicle, because it is more difficult for the front side portion 42 of the belt guide 122 to bend than the rear side portion 44 of the belt guide 122, there are operation and effects that are similar to those of the passenger restraining devices 10, 100 of the first and third embodiment.

Further, in the passenger restraining device 120 for a vehicle, the ease of bending of the front side portion 124B and the rear side portion 124A is set to differ due to the absence/presence of the plural hole portions 130 that are formed in the thickness direction in the pad 124. Therefore, the ease of bending of the front side portion 124B and the rear side portion 124A of the belt guide 122 can be adjusted by a simple structure.

Fifth Embodiment

A passenger restraining device 140 for a vehicle of a fifth embodiment is described next by using FIG. 13 and FIG. 14. Note that structural portions that are the same as those of the above-described first through fourth embodiments are denoted by the same reference numerals, and description thereof is omitted.

Figure 13:
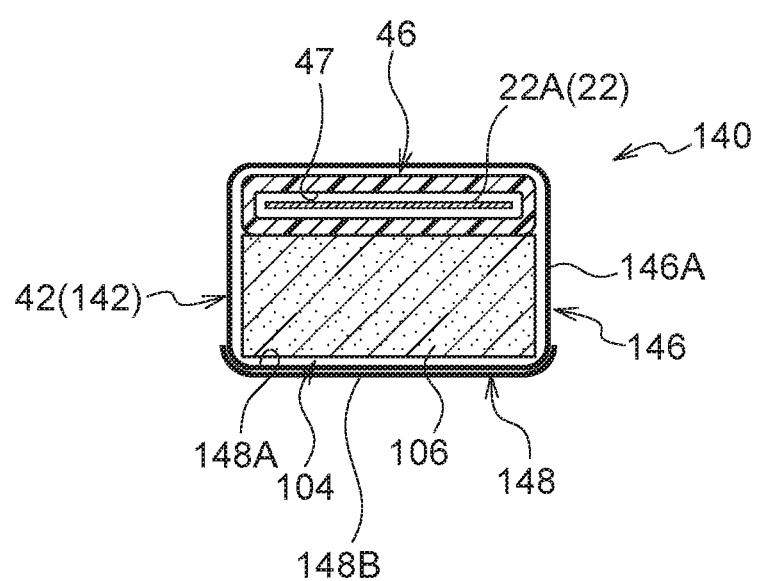
FIG. 13 is a cross-sectional view that corresponds to FIG. 4A and shows a belt guide that is used in a passenger restraining device for a vehicle relating to a fifth embodiment.
Figure 14:
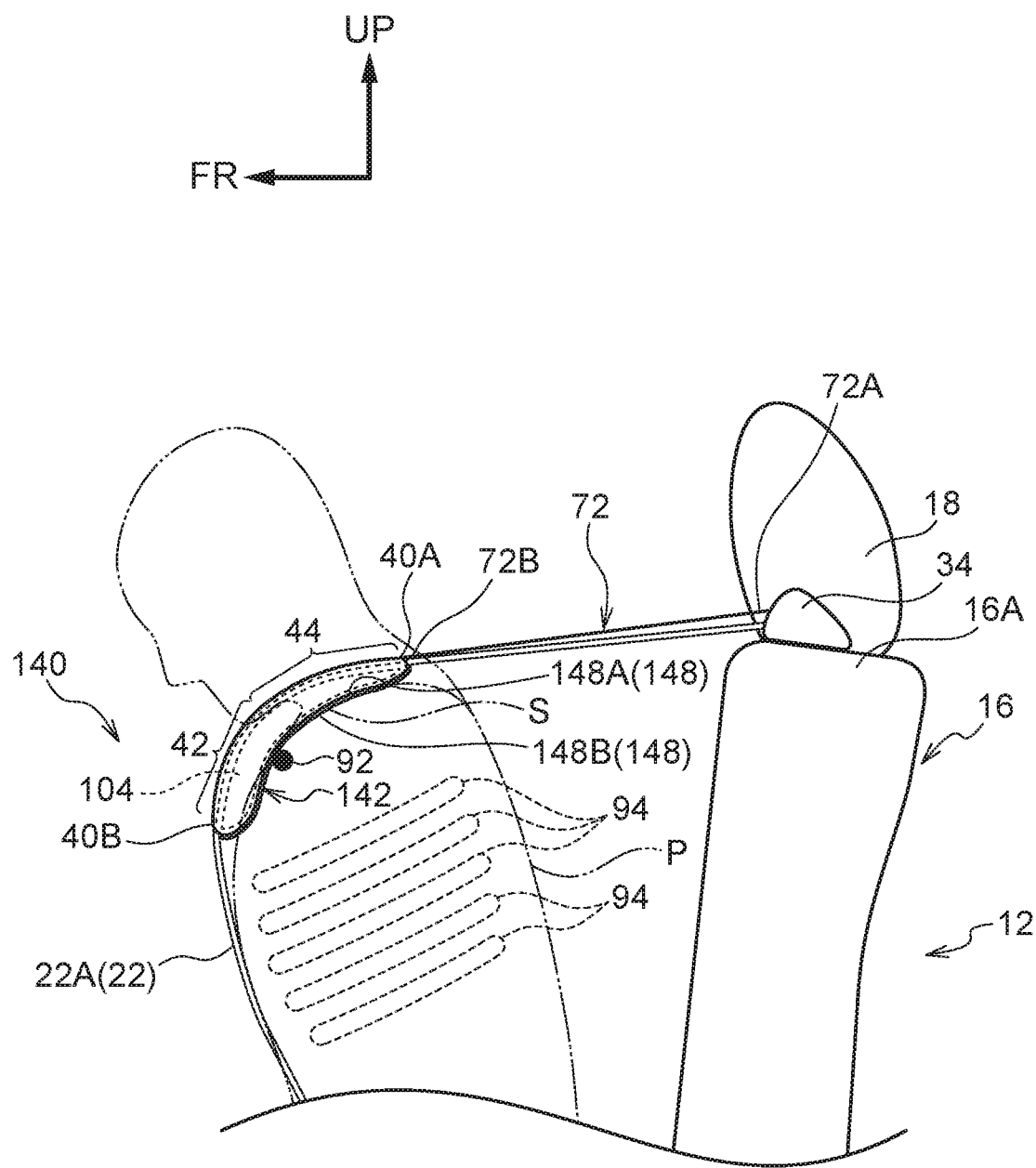
FIG. 14 is a side view showing the state of the belt guide in the latter half of a front collision, in the passenger restraining device for a vehicle relating to the fifth embodiment.

As shown in FIG. 13 and FIG. 14, the passenger restraining device 140 for a vehicle has a belt guide 142. The pad 104 (see FIG. 8) is provided at the interior of the belt guide 142 and, as an example, along the tubular portion 46 through which the shoulder belt portion 22A is inserted. A skin 146 that covers the tubular portion 46 and the pad 104 is provided at the surface of the belt guide 142. A lower surface skin 148, which is disposed at the side of the passenger P (see FIG. 14) who is seated in the seat 12, is provided at the skin 146. The lower surface skin 148 is structured by a double-layered fabric, and has a first lower surface skin 148A that covers the pad 104 side, and a second lower surface skin 148B that is at the side contacting the passenger P (see FIG. 14). Namely, the second lower surface skin 148B is an example of the lower surface skin at the side contacting the passenger P, of the double-layered fabric. A general portion 146A that structure the other portion of the skin 146, i.e., the portion other than the lower surface skin 148, is structured by a single layer of skin. In the fifth embodiment, the general portion 146A and the first lower surface skin 148A are formed by a fabric that is a continuous, same material.

The second lower surface skin 148B that contacts the passenger P (see FIG. 14) is formed of a fabric whose coefficient of friction is lower than the coefficient of friction of the general portion 146A. In the fifth embodiment, because the general portion 146A and the first lower surface skin 148A are formed by a fabric that is a continuous, same material, the second lower surface skin 148B is formed of a fabric whose coefficient of friction is lower than the coefficient of friction of the first lower surface skin 148A.

Figure 18:
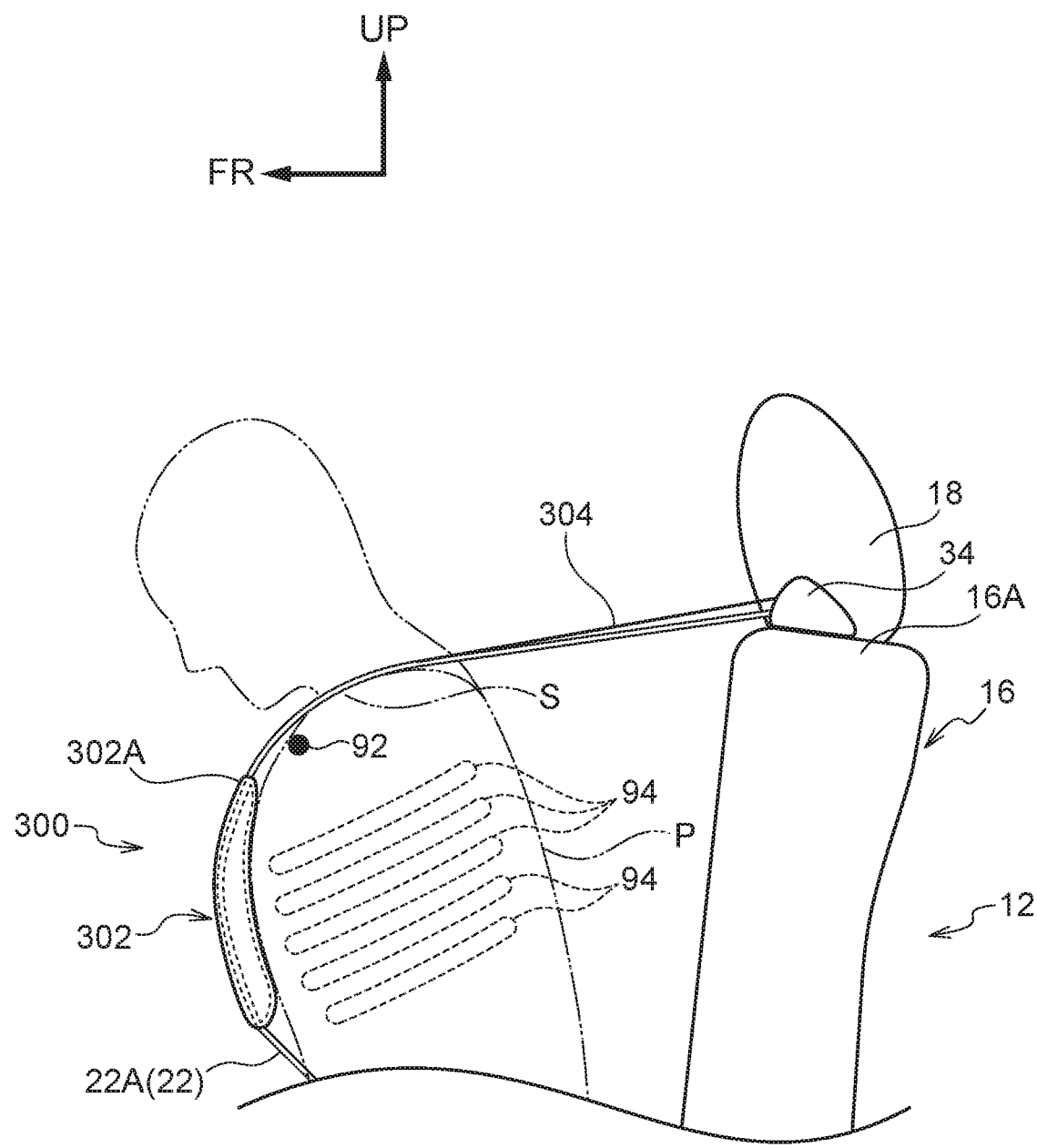
FIG. 18 is a side view showing a state in which a belt guide remains at the chest portion of the passenger at the time of a front collision, in a passenger restraining device for a vehicle of another comparative example.

Here, the state at the time of a front collision at a passenger restraining device 300 for a vehicle of another comparative example is described by using FIG. 18. As shown in FIG. 18, the passenger restraining device 300 for a vehicle has a belt guide 302 through which the shoulder belt portion 22 A is inserted. A length direction rear end portion 302A of the belt guide 302 is fixed by a belt-shaped fixing member 304 to the bezel 34 of the upper portion 16A of the seatback 16. The fixing member 304 is structured by, for example, a member that is extensible. The coefficient of friction of the belt guide 302 is either substantially the same as the coefficient of friction of the general portion 146A that is shown in FIG. 13, or is higher than the coefficient of friction of the general portion 146A shown in FIG. 13. In a case in which the passenger P who is seated in the seat 12 is wearing clothes of a material having a high coefficient of friction, the clothes of the passenger P and the belt guide 302 do not slide at the time of a front collision, and the belt guide 302 remains at the chest portion of the passenger P. Therefore, there is the possibility that the belt guide 302 will push the chest portion of the passenger P, accompanying the movement of the passenger P tilting forward at the time of a front collision.

In contrast, the passenger restraining device 140 for a vehicle of the fifth embodiment has the following operation and effects in addition to the operation and effects that are due to structures similar to those of the first through fourth embodiments.

In the passenger restraining device 140 for a vehicle of the fifth embodiment, the lower surface skin 148 at the side of the passenger P who is seated in the seat 12 is structured by a double-layered fabric, and the second lower surface skin 148B, which is at the side that contacts the passenger P of the double-layered fabric, is formed by a fabric whose coefficient of friction is lower than the coefficient of friction of the general portion 146A of the skin 146. Due thereto, as shown in FIG. 14, at the time when the passenger P tilts forward during a front collision, the belt guide 142 does not remain at its initial position (e.g., the chest portion) of contacting the passenger P, and moves to a position facing the collarbone 92 of the passenger P. Therefore, load can be transmitted stably to the collarbone 92 of the passenger P at the front side portion 42 of the belt guide 142, and compressing of the chest portion of the passenger P by the belt guide 142 can be reduced.

Sixth Embodiment

A passenger restraining device 160 for a vehicle of a sixth embodiment is described next by using FIG. 15A through FIG. 17. Note that structural portions that are the same as those of the above-described first through fifth embodiments are denoted by the same reference numerals, and description thereof is omitted.

Figure 15A:
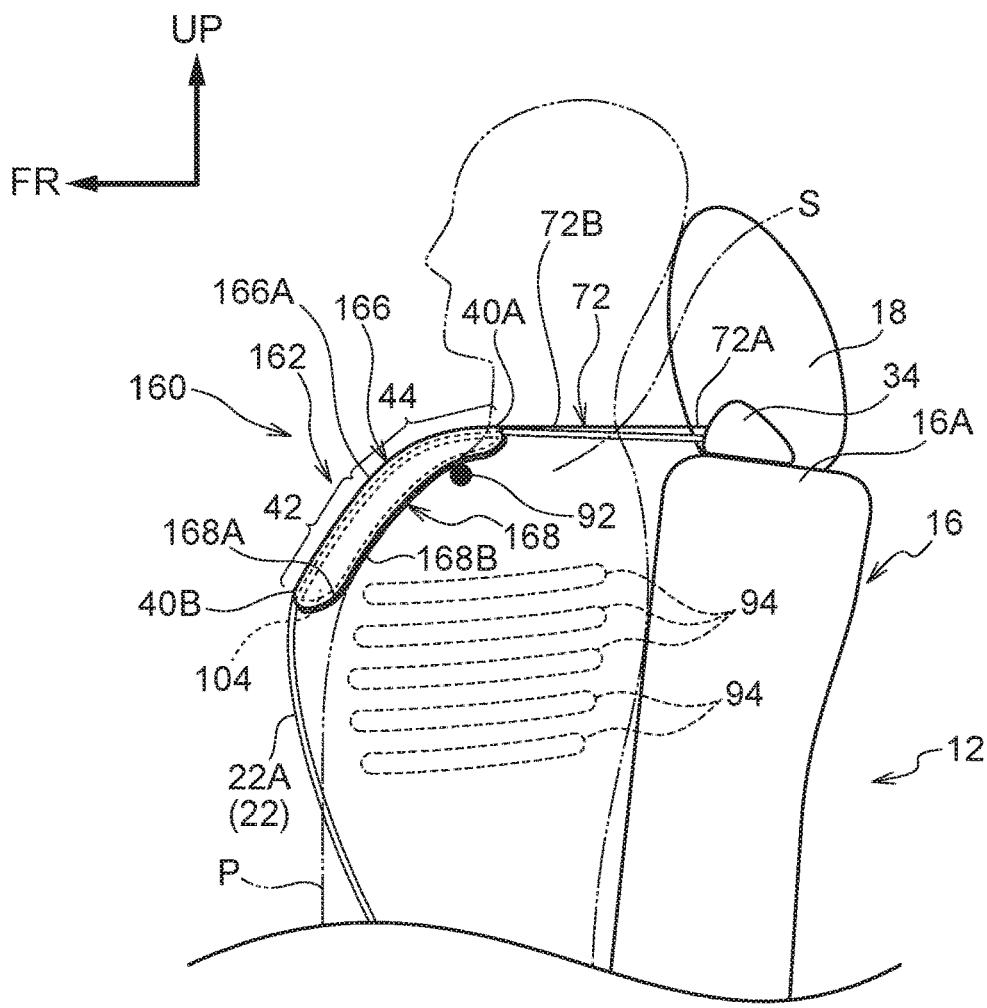
FIG. 15A is a side view showing a state in which the passenger who is seated in the vehicle seat is restrained by a passenger restraining device for a vehicle relating to a sixth embodiment.
Figure 15B:
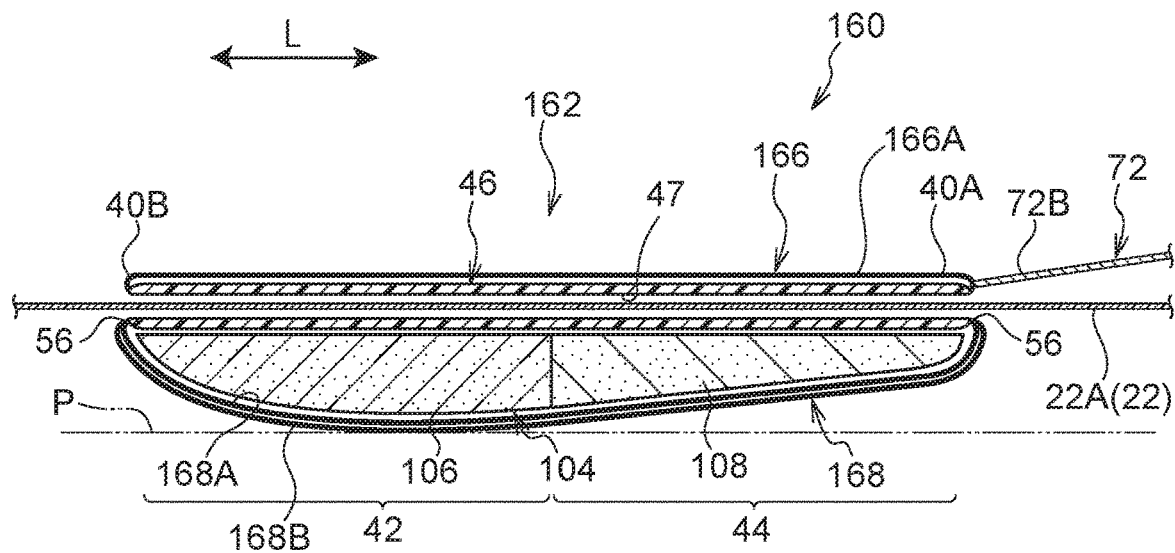
FIG. 15B is an enlarged sectional view, along the length direction of a belt guide that is used in the passenger restraining device for a vehicle relating to the sixth embodiment, showing a state in which the belt guide is completely straight.

As shown in FIG. 15A and FIG. 15B, the passenger restraining device 160 for a vehicle has a belt guide 162. The pad 104 is provided at the interior of the belt guide 162 and, as an example, along the tubular portion 46 through which the shoulder belt portion 22A is inserted. A skin 166 that covers the tubular portion 46 and the pad 104 is provided at the surface of the belt guide 162. A lower surface skin 168, which is disposed at the side of the passenger P who is seated in the seat 12, is provided at the skin 166. The lower surface skin 168 is structured by a double-layered fabric, and has a first lower surface skin 168A that covers the pad 104 side, and a second lower surface skin 168B that is at the side contacting the passenger P. Namely, the second lower surface skin 168B is an example of the lower surface skin at the side contacting the passenger P, of the double-layered fabric. A general portion 166A that structures the other portion of the skin 166, i.e., the portion other than the lower surface skin 168, is structured by a single layer of skin. The general portion 166A and the first lower surface skin 168A are formed by a fabric that is a continuous, same material.

The second lower surface skin 168B that contacts the passenger P is formed of a fabric that stretches more easily than the general portion 166A. In the sixth embodiment, because the general portion 166A and the first lower surface skin 168A are formed by a fabric that is a continuous, same material, the second lower surface skin 168B is formed of a fabric that stretches more easily than the first lower surface skin 168A.

The passenger restraining device 160 for a vehicle of the sixth embodiment has the following operation and effects in addition to the operation and effects that are due to structures similar to those of the first through fifth embodiments.

In the passenger restraining device 160 for a vehicle, as shown in FIG. 15A, in a usual state (i.e., a state that is not at the time of a front collision), the front side portion 42 of the belt guide 162 is disposed further toward the vehicle front side than the collarbone 92 of the passenger P who is seated in the seat 12. Namely, the rear side portion 44 of the belt guide 162 is disposed at a position facing the collarbone 92 of the passenger P.

Figure 16A:
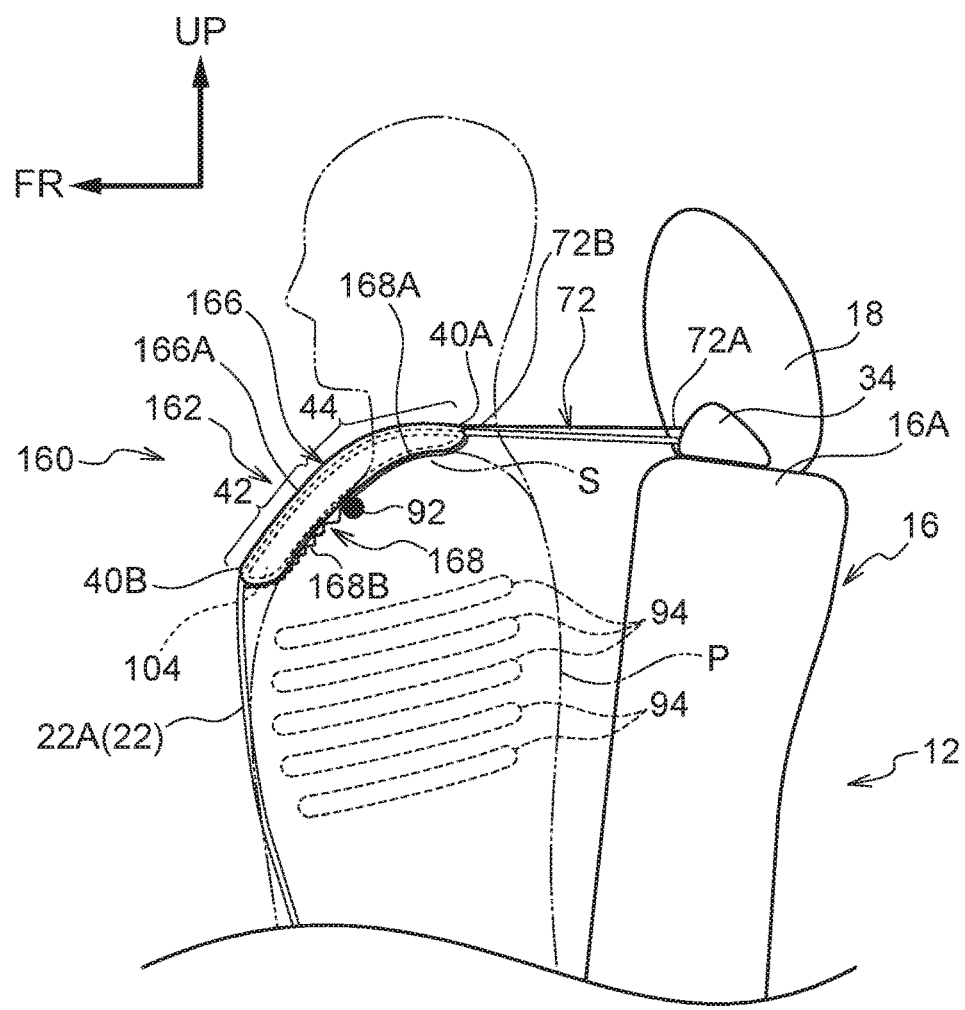
FIG. 16A is a side view showing a state in which relative positions of the passenger and the belt guide shift in the initial stage of a front collision, in the passenger restraining device for a vehicle relating to the sixth embodiment.
Figure 16B:
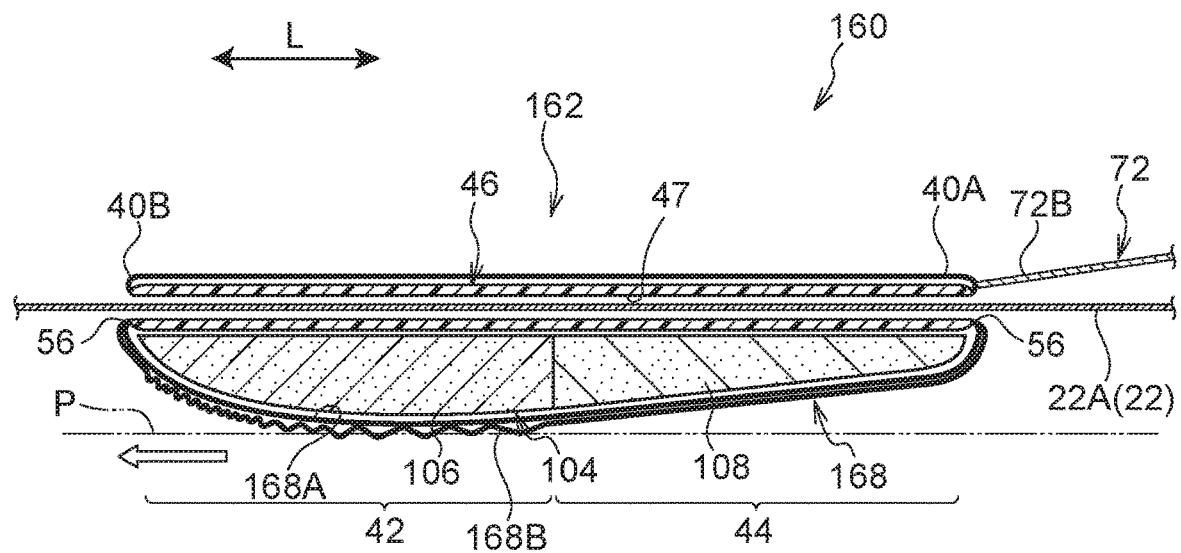
FIG. 16B is an enlarged sectional view, along the length direction of the belt guide that is used in the passenger restraining device for a vehicle relating to the sixth embodiment, showing a state in which the belt guide in the initial stage of a front collision is completely straight.

For example, in a case in which the friction between the skin 166 and the clothes that are being worn by the passenger P who is seated in the seat 12 is great, as shown in FIG. 16A, at the time of a front collision, when the passenger P seated in the seat 12 moves toward the vehicle front side with respect to the seatback 16 (i.e., the passenger P enters into a posture of tilting forward), the second lower surface skin 168B stretches, and the belt guide 162 moves toward the vehicle upper side and the vehicle rear side with respect to the passenger P. Namely, the second lower surface skin 168B stays at the front side portion 42 of the belt guide 162, and the second lower surface skin 168B stretches at the rear side portion 44 of the belt guide 162 (see FIG. 16B), and, due thereto, the belt guide 162 moves toward the vehicle upper side and the vehicle rear side with respect to the passenger P.

Figure 17:
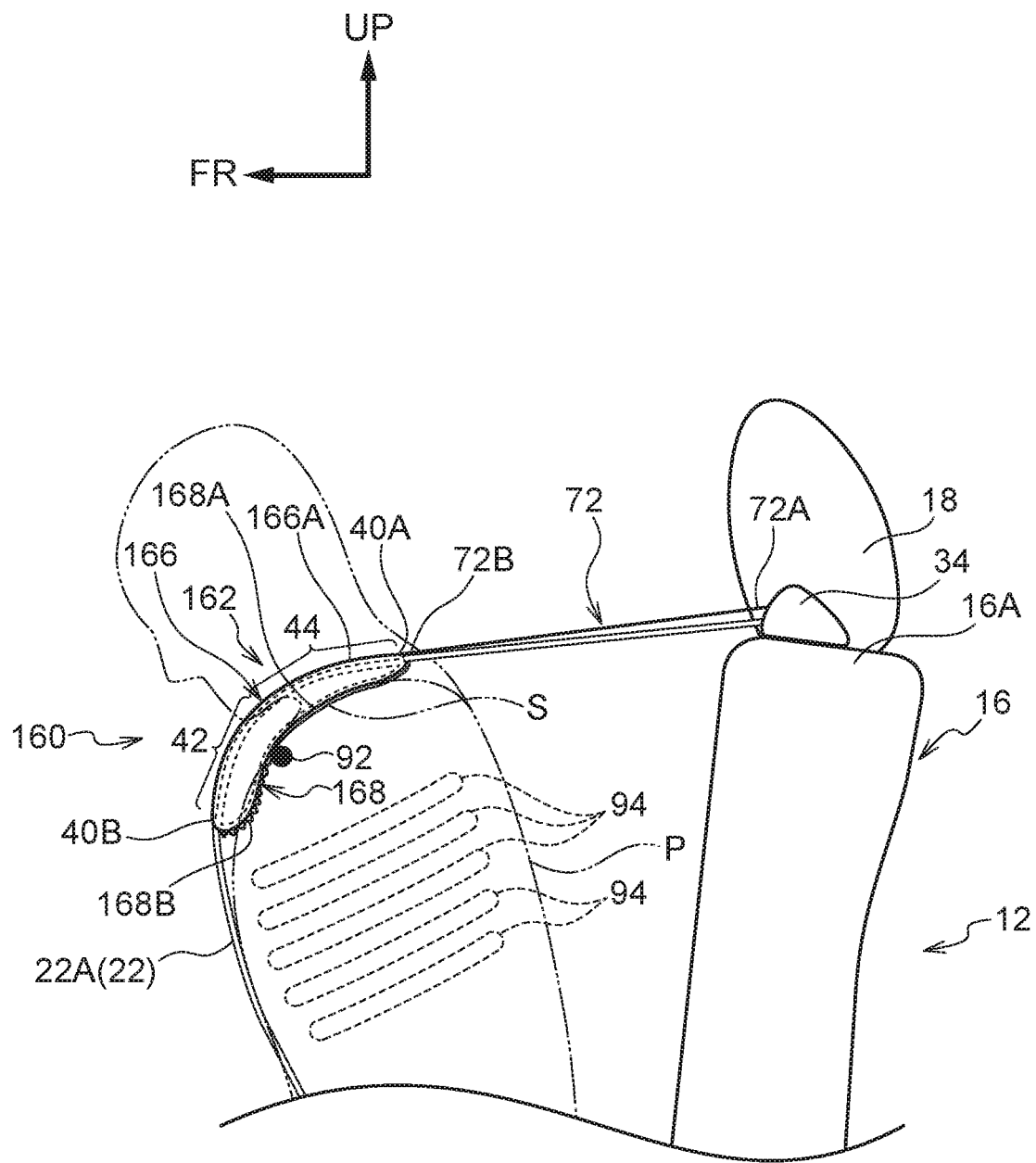
FIG. 17 is a side view showing the state of the belt guide in the latter half of a front collision, in the passenger restraining device for a vehicle relating to the sixth embodiment.

As shown in FIG. 17, when the passenger P who is seated in the seat 12 moves further toward the vehicle front side with respect to the seatback 16 in the latter half of the front collision, the second lower surface skin 168B stretches move, and the belt guide 162 moves further toward the vehicle upper side and the vehicle rear side with respect to the passenger P. Due thereto, due to the front side portion 42 of the belt guide 162 being disposed at a region facing the collarbone 92 of the passenger P, the collarbone 92 of the passenger P can be pushed by the front side portion 42 of the belt guide 162. Accordingly, at the time of a front collision, the inputted load from the shoulder belt portion 22A to the passenger P can be transmitted to the collarbone 92 whose resistance is higher than that of the ribs 94, and compression of the chest portion of the passenger P by the belt guide 162 can be reduced.

[Supplementary Explanation]

Note that, in the first embodiment, the fixing of the bezel 34 and the length direction rear end portion 40A of the belt guide 40 by the connecting member 36 is cancelled due to the joined portion of the bezel 34 and the one end portion 36A of the connecting member 36 being severed. However, the present disclosure is not limited to this structure. For example, the connecting member may be severed at any position in the length direction thereof at the time when tension of a predetermined value or greater is applied thereto.

Further, in the first and second embodiments, there are the plural slits 54 at the rear side portion 48A of the pad 48. However, the shape and the number of the slits 54 can be changed. Further, although slits are not formed in the front side portion 48B of the pad 48, the present disclosure not limited to this structure. For example, there may be a structure in which plural slits are formed in the length direction at the front side portion of the pad as well, and the size (e.g., the depth) of the plural slits of the rear side portion of the pad is made to be larger than the size (e.g., the depth) of the plural slits of the front side portion of the pad.

Further, in the fourth embodiment, there are the plural hole portions 130 in the rear side portion 124A of the pad 124. However, the size and the number of the hole portions 130 can be changed. Further, although hole portions are not formed in the front side portion 124B of the pad 124, the present disclosure not limited to this structure. For example, there may be a structure in which plural hole portions are formed in the front side portion of the pad as well, and the size of the plural hole portions of the rear side portion of the pad is made to be larger than the size of the plural hole portions of the front side portion of the pad.

Further, in the fifth and sixth embodiments, the pad 104 and the extensible member 72 are provided, but the present disclosure is not limited to this structure. For example, instead of the pad 104, the pad 48 or the pad 124 that are used in other embodiments may be provided, and, instead of the extensible member 72, the connecting member 36 may be provided.

Further, in the first through sixth embodiments, the outer shapes of the pads 48, 104, 124 can be changed. In the first through sixth embodiments, the average of the thicknesses of the front side portions of the pads 48, 104, 124 are thicker than the average of the thicknesses of the rear side portions of the pads 48, 104, 124, but the present disclosure is not limited to this structure. For example, the structures of the pads of the first through sixth embodiments may be changed such that the thicknesses are uniform at the front side portion and the rear side portion of the pad. Further, the pads may be structured such that the front side portion is more difficult to bend than the rear side portion due to the front side portion in the length direction being made to be thicker than the rear side portion.

Further, the first through sixth embodiments are provided with the tubular portion 46 through which the shoulder belt portion 22A is inserted, but the present disclosure is not limited to this structure. Provided that there is a structure in which the shoulder belt portion 22A slides in the length direction, a structure other than the tubular portion may be employed. For example, there may be a structure in which low-friction, sheet-shaped members are disposed at the upper side and the lower side of the shoulder belt portion 22A. Further, there may be a structure in which the retractor 26 that has a pretensioner function is installed at the seatback 16.

Note that, although the present disclosure has been described in detail by using specific embodiments, the present disclosure is not limited to these embodiments, and it will be clear to those skilled in the art that other various embodiments are possible within the scope of the present disclosure.

Note that the disclosures of Japanese Patent Application No. 2017-251756 that was filed on Dec. 27, 2017 and Japanese Patent Application No. 2018-204287 that was filed Oct. 30, 2018 are, in their entireties, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A passenger restraining device for a vehicle, comprising:
   a three-point seatbelt device including a shoulder belt that extends from above one side in a seat transverse direction of a seatback, which is part of a vehicle seat configured to receive a passenger in a sitting position, toward a buckle that is at a lower portion of another side in the seat transverse direction;
   a belt guide that is at an upper portion of the one side, through which the shoulder belt is inserted, and that is configured to be along a restrained surface of the passenger when the passenger is seated in the vehicle seat;
   a fixing portion that fixes a rear end portion, in a length direction, of the belt guide to a seat shoulder opening that is at an upper portion of the seatback on the one side; and
   a front side portion that is at a front side of the belt guide in the length direction, that is configured to be disposed further toward a vehicle front side than a collarbone of the passenger when the passenger is seated in the vehicle seat, and that is structured so as to be hard to bend as compared with a rear side portion of the belt guide in the length direction,
   wherein the fixing portion is a belt fixed to the seat shoulder opening and the belt guide.

2. The passenger restraining device for a vehicle of claim 1, wherein the fixing portion is structured so that fixing of (a) the seat shoulder opening to (b) the rear end portion of the belt guide is cancelled when tension of a predetermined value or greater is applied.

3. The passenger restraining device for a vehicle of claim 1, wherein the fixing portion is structured so as to, when tension of a predetermined value or greater is applied, extend in accordance with a distance between the seat shoulder opening and the rear end portion of the belt guide.

4. The passenger restraining device for a vehicle of claim 1, wherein the belt guide has a belt insert-through portion through which the shoulder belt is inserted, and a pad that is disposed, with respect to the belt insert-through portion, at a side that is toward the passenger when the passenger is seated in the vehicle seat.

5. The passenger restraining device for a vehicle of claim 4, wherein the pad is set such that ease of bending increases due to a plurality of slits that are formed in the pad in a thickness direction of the pad at a side that is toward the passenger when the passenger is seated in the vehicle seat, or due to a size of the plurality of slits.

6. The passenger restraining device for a vehicle of claim 4, wherein the front side portion is formed of a material that is harder than the rear side portion.

7. The passenger restraining device for a vehicle of claim 4, wherein the front side portion is thicker than the rear side portion.

8. The passenger restraining device for a vehicle of claim 4, wherein the pad is set such that ease of bending increases due to a plurality of hole portions that are formed in the pad in a thickness direction of the pad, or due to a size of the plurality of hole portions.

9. The passenger restraining device for a vehicle of claim 4, further comprising a skin that covers the belt insert-through portion and the pad, wherein a lower surface of the skin at a side configured to face the passenger when the passenger is seated in the vehicle seat comprises a double-layered fabric, and a side of the double-layered fabric configured to contact the passenger is has a coefficient of friction that is lower than other portions of the skin.

10. The passenger restraining device for a vehicle of claim 4, further comprising a skin that covers the belt insert-through portion and the pad, wherein a lower surface of the skin at a side configured to face the passenger when the passenger is seated in the vehicle seat comprises a double-layered fabric, and a side of the double-layered fabric configured to contact the passenger is stretches more easily than other portions of the skin.

11. The passenger restraining device for a vehicle of claim 1, wherein the belt is substantially parallel to the shoulder belt.

12. The passenger restraining device for a vehicle of claim 1, wherein the fixing portion is configured to cause the belt guide to move relative to the passenger while the passenger moves forward until a predetermined tension is exceeded, and the fixing portion is configured to sever when the predetermined tension is exceeded.

13. The passenger restraining device for a vehicle of claim 1, wherein the fixing portion allows a predetermined range of movement of the belt guide relative to the seat shoulder opening.

* * * * *